United States Patent
Erceg et al.

(10) Patent No.: US 9,107,099 B2
(45) Date of Patent: Aug. 11, 2015

(54) DISTRIBUTED SIGNAL FIELD FOR COMMUNICATIONS WITHIN MULTIPLE USER, MULTIPLE ACCESS, AND/OR MIMO WIRELESS COMMUNICATIONS

(71) Applicant: BROADCOM CORPORATION, Irvine, CA (US)

(72) Inventors: Vinko Erceg, Cardiff by the Sea, CA (US); Joseph Paul Lauer, Vienna, VA (US); Matthew James Fischer, Mountain View, CA (US); Peiman Amini, Mountain View, CA (US); Joonsuk Kim, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/089,939

(22) Filed: Nov. 26, 2013

(65) Prior Publication Data

US 2014/0078966 A1 Mar. 20, 2014

Related U.S. Application Data

(63) Continuation of application No. 12/852,859, filed on Aug. 9, 2010, now Pat. No. 8,599,804.

(60) Provisional application No. 61/232,316, filed on Aug. 7, 2009, provisional application No. 61/240,285, filed on Sep. 7, 2009, provisional application No. 61/250,531, filed on Oct. 11, 2009, provisional application No. 61/255,232, filed on Oct. 27, 2009.

(51) Int. Cl.

| | |
|---|---|
| *H04W 4/00* | (2009.01) |
| *H04W 28/06* | (2009.01) |
| *H04L 1/00* | (2006.01) |
| *H04L 5/00* | (2006.01) |
| *H04L 12/28* | (2006.01) |
| *H04B 7/04* | (2006.01) |
| *H04B 7/06* | (2006.01) |
| *H04L 1/06* | (2006.01) |

(52) U.S. Cl.
CPC ........... *H04W 28/065* (2013.01); *H04L 1/0003* (2013.01); *H04L 1/0009* (2013.01); *H04L 1/0075* (2013.01); *H04L 1/0079* (2013.01); *H04L 5/005* (2013.01); *H04L 5/0023* (2013.01); *H04L 5/0051* (2013.01); *H04L 5/0053* (2013.01); *H04W 28/06* (2013.01); *H04B 7/0452* (2013.01); *H04B 7/0669* (2013.01); *H04B 7/0697* (2013.01); *H04L 1/0025* (2013.01); *H04L 1/06* (2013.01)

(58) Field of Classification Search
None
See application file for complete search history.

(56) References Cited

U.S. PATENT DOCUMENTS

| | | | | |
|---|---|---|---|---|
| 2010/0260159 A1* | 10/2010 | Zhang et al. | .................. | 370/338 |
| 2011/0013547 A1* | 1/2011 | Liao et al. | ..................... | 370/310 |

*Primary Examiner* — Eunsook Choi
(74) *Attorney, Agent, or Firm* — Garlick & Markison; Shayne X. Short

(57) ABSTRACT

Distributed signal field for communications within multiple user, multiple access, and/or MIMO wireless communications. In accordance with wireless communications, a signal (SIG) field employed within such packets is distributed or partitioned into at least two separate signal fields (e.g., SIG A and SIG B) that are located in different portions of the packet. A first of the SIG fields includes information that may be processed and decoded by all wireless communication devices, and a second of the SIG fields includes information that is specific to one or more particular wireless communication devices (e.g., a specific wireless communication device or a specific subset of the wireless communication devices). The precise locations of the at least first and second SIG fields within a packet may be varied, including placing a second of the SIG fields (e.g., including user-specific information) adjacent to and preceding a data field in the packet.

20 Claims, 27 Drawing Sheets

| field | length | bandwidth | coding type | not sounding | short GI (SGI) | MU-MIMO bits | | | | CRC | tail bits (BCC) | reserved |
|---|---|---|---|---|---|---|---|---|---|---|---|---|
| | | | | | | MU-MIMO indication | LTF mode | GroupID | AID list | | | |
| size (bits) | 12 | 2 | 2 | 1 | 1 | 1 | 1 | 4 | 9 | 8 | 6 | 2 |

15

VHT-SIG-A

FIG. 15  SU options

FIG. 16   MU resolvable options

FIG. 17   MU non-resolvable options

| field | size (bits) |
|---|---|
| bandwidth | 2 |
| N_LTF | 3 |
| short GI (SGI) | 1 |
| coding type | 1 |
| not sounding | 1 |
| aggregation | 1 |
| reserved | 25 |
| CRC | 8 |
| tail bits | 6 |

FIG. 20 VHT-SIG-A

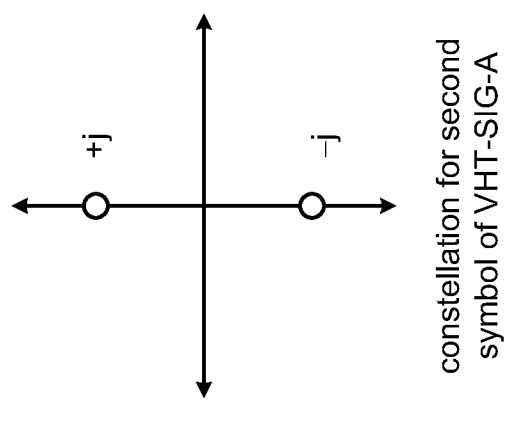
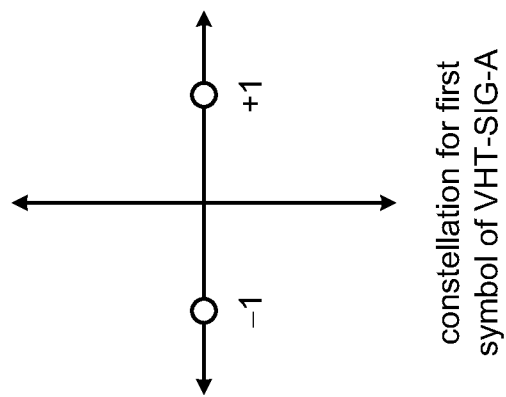
FIG. 21    VHT-SIG-A

| field | size (bits) |
|---|---|
| MCS | 7 |
| length | 22 |
| STBC | 3 |
| smoothing | 1 |
| reserved | 1 |
| CRC | 8 |
| tail bits | 6 |

FIG. 22   VHT-SIG-B

| field | size (bits) |
|---|---|
| length | 12 |
| bandwidth | 2 |
| coding type | 2 |
| not sounding | 1 |
| short GI (SGI) | 1 |
| MU-MIMO bits / MU-MIMO indication | 1 |
| MU-MIMO bits / LTF mode | 1 |
| MU-MIMO bits / GroupID | 4 |
| MU-MIMO bits / AID list | 9 |
| CRC | 8 |
| tail bits (BCC) | 6 |
| reserved | 2 |

MU-MIMO bits total: 15

VHT-SIG-A

FIG. 23

| field | MCS | STBC | smoothing | not sounding | CRC | tail bits (BCC) |
|---|---|---|---|---|---|---|
| size (bits) | 7-8 | 2-3 | 1 | 1 | 4-8 | 6 |

FIG. 24 VHT-SIG-B

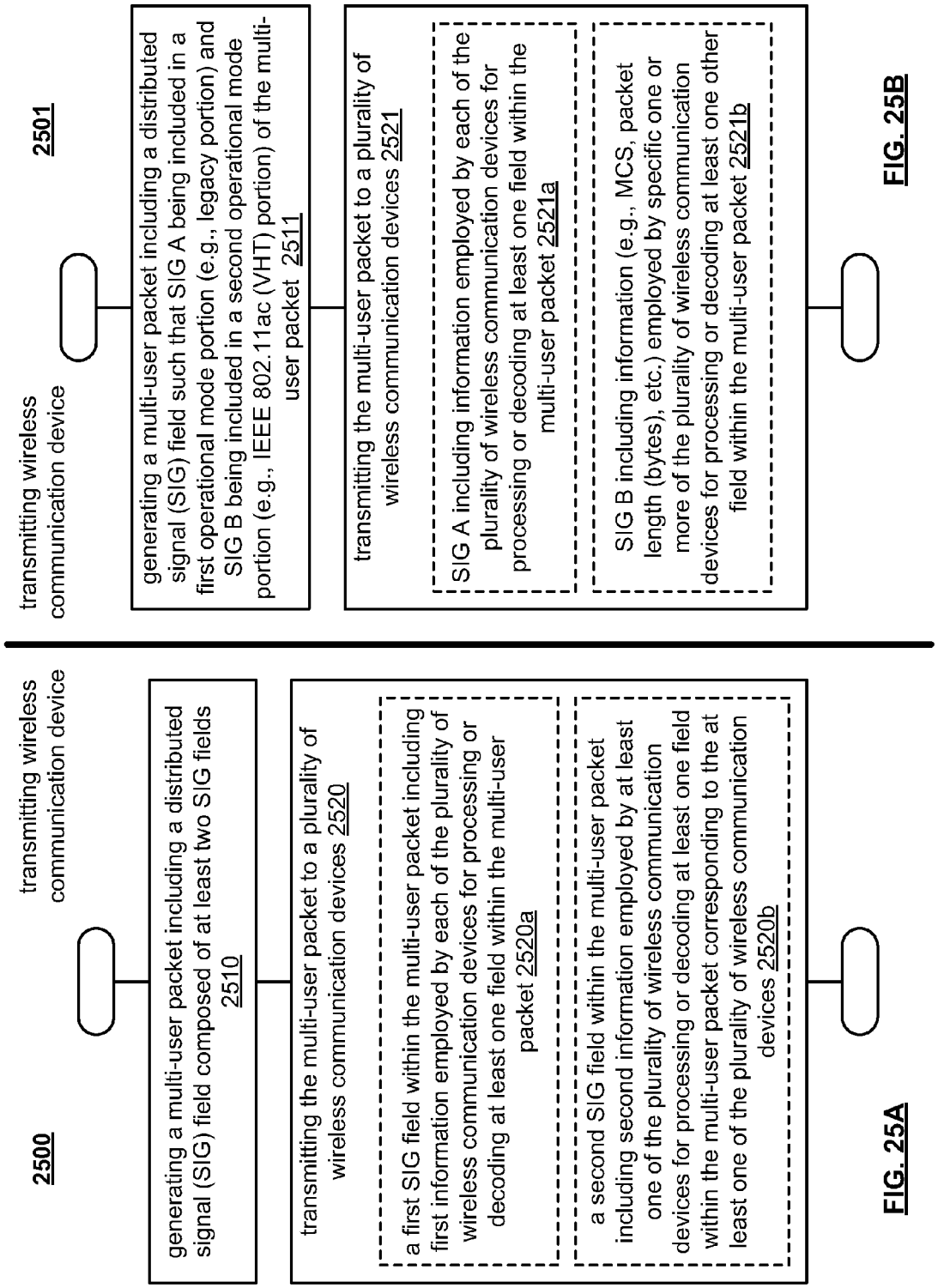

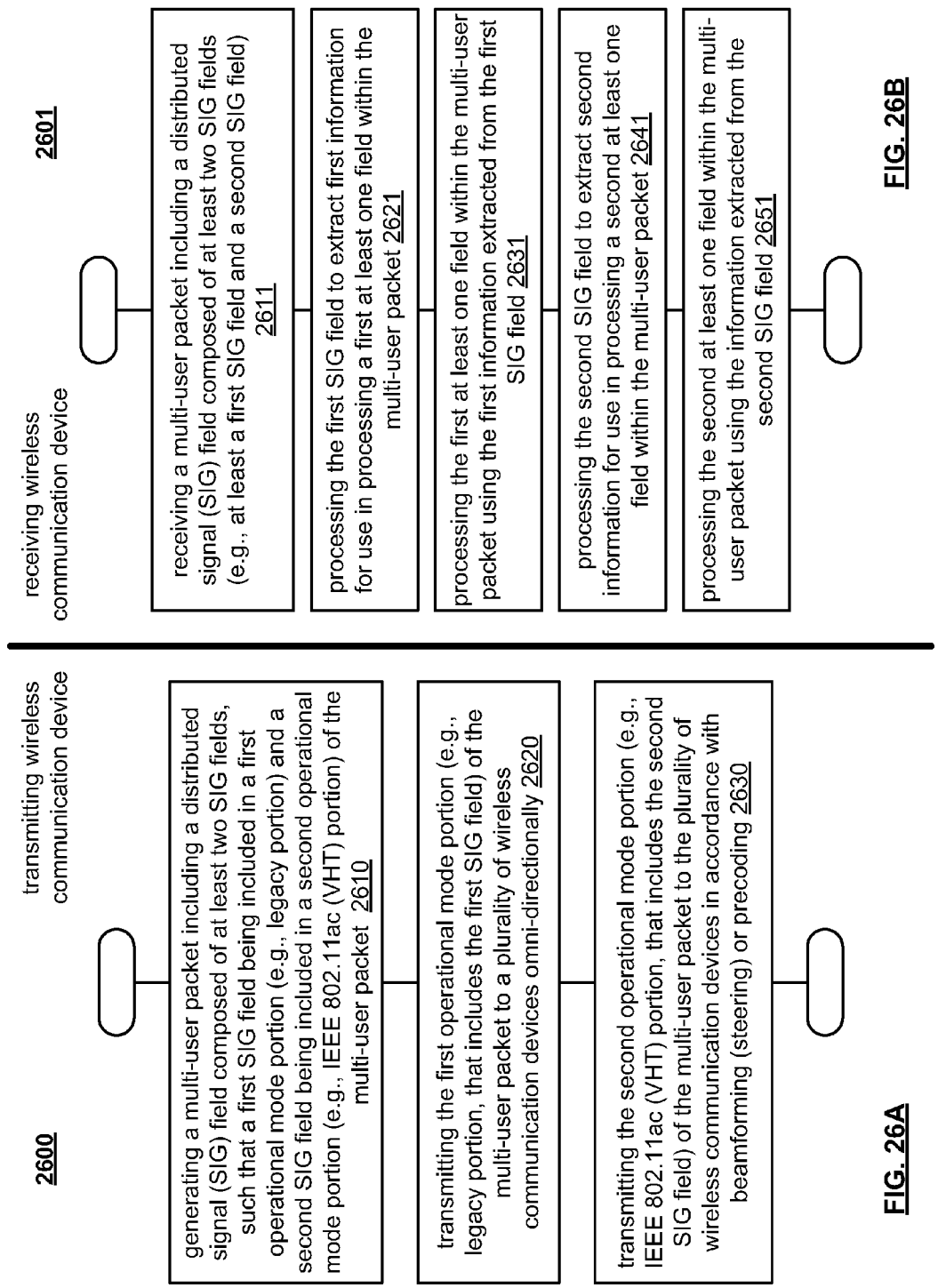

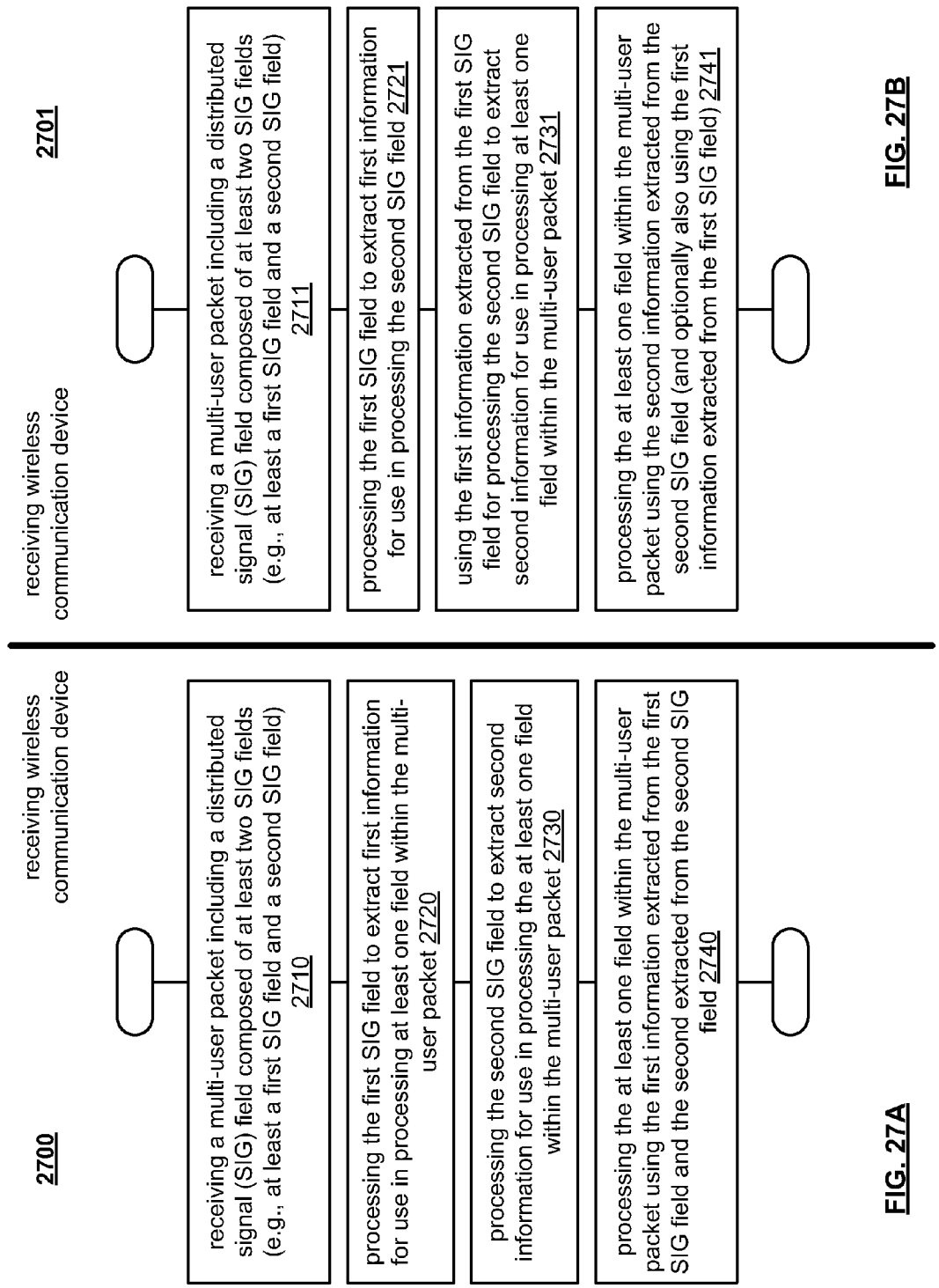

DISTRIBUTED SIGNAL FIELD FOR COMMUNICATIONS WITHIN MULTIPLE USER, MULTIPLE ACCESS, AND/OR MIMO WIRELESS COMMUNICATIONS

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the 1. U.S. Utility patent application Ser. No. 12/852,859, entitled "Distributed signal field for communications within multiple user, multiple access, and/or MIMO wireless communications," filed Aug. 9, 2010, and scheduled subsequently to be issued as U.S. Pat. No. 8,599,804 on Dec. 3, 2013 (as indicated in an ISSUE NOTIFICATION mailed on Nov. 13, 2013), which claims priority pursuant to 35 U.S.C. §119(e) to the following U.S. Provisional Patent Applications which are hereby incorporated herein by reference in their entirety and made part of the present U.S. Utility Patent Application for all purposes:

a. U.S. Provisional Application Ser. No. 61/232,316, entitled "WLAN next generation PHY header options," filed Aug. 7, 2009.
 b. U.S. Provisional Application Ser. No. 61/240,285, entitled "WLAN next generation PHY header options," filed Sep. 7, 2009.
 c U.S. Provisional Application Ser. No. 61/250,531, entitled "WLAN next generation PHY header options," filed Oct. 11, 2009.
 d. U.S. Provisional Application Ser. No. 61/255,232, entitled "WLAN next generation PHY header options," filed Oct. 27, 2009.

INCORPORATION BY REFERENCE

The following U.S. Utility Patent Applications are hereby incorporated herein by reference in their entirety and are made part of the present U.S. Utility Patent Application for all purposes:

1. U.S. Utility patent application Ser. No. 12/796,655, entitled "Group identification and definition within multiple user, multiple access, and/or MIMO wireless communications," filed on Jun. 8, 2010, pending.

2. U.S. Utility patent application Ser. No. 12/816,352, entitled "Carrier sense multiple access (CSMA) for multiple user, multiple access, and/or MIMO wireless communications," filed on Jun. 15, 2010, pending.

3. U.S. Utility patent application Ser. No. 12/817,118, entitled "Scheduled clear to send (CTS) for multiple user, multiple access, and/or MIMO wireless communications," filed on Jun. 16, 2010, pending.

4. U.S. Utility patent application Ser. No. 12/821,094, entitled "Medium accessing mechanisms within multiple user, multiple access, and/or MIMO wireless communications," filed on Jun. 22, 2010, now U.S. Pat. No. 8,441,975, issued on May 14, 2013.

The following IEEE standard is hereby incorporated herein by reference in its entirety and is made part of the present U.S. Utility Patent Application for all purposes:

1. IEEE 802.11-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™—2007, (Revision of IEEE Std 802.11-1999), 1232 pages.

BACKGROUND OF THE INVENTION

1. Technical Field of the Invention

The invention relates generally to communication systems; and, more particularly, it relates to formatting of a distributed signal field for communications within multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802, 11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIG. 20 is a diagram illustrating an embodiment of a format of a first SIG field (e.g., VHT-SIG-A) as may be employed in accordance with a distributed SIG field.

FIG. 21 is a diagram illustrating an embodiment of constellations as may be employed for at least two orthogonal frequency division multiplexing (OFDM) symbols that may be employed in accordance with a first SIG field (e.g., VHT-SIG-A) as may be employed in accordance with a distributed SIG field.

FIG. 22 is a diagram illustrating an embodiment of a format of a second SIG field (e.g., VHT-SIG-B) as may be employed in accordance with a distributed SIG field.

FIG. 23 is a diagram illustrating an alternative embodiment of a format of a first SIG field (e.g., VHT-SIG-A) as may be employed in accordance with a distributed SIG field.

FIG. 24 is a diagram illustrating an alternative embodiment of a format of a second SIG field (e.g., VHT-SIG-B) as may be employed in accordance with a distributed SIG field.

FIG. 25A, FIG. 25B, FIG. 26A, FIG. 26B, FIG. 27A, and FIG. 27B are diagrams illustrating various embodiments of methods for operating one or more wireless communication devices.

DETAILED DESCRIPTION OF THE INVENTION

Figure 1:
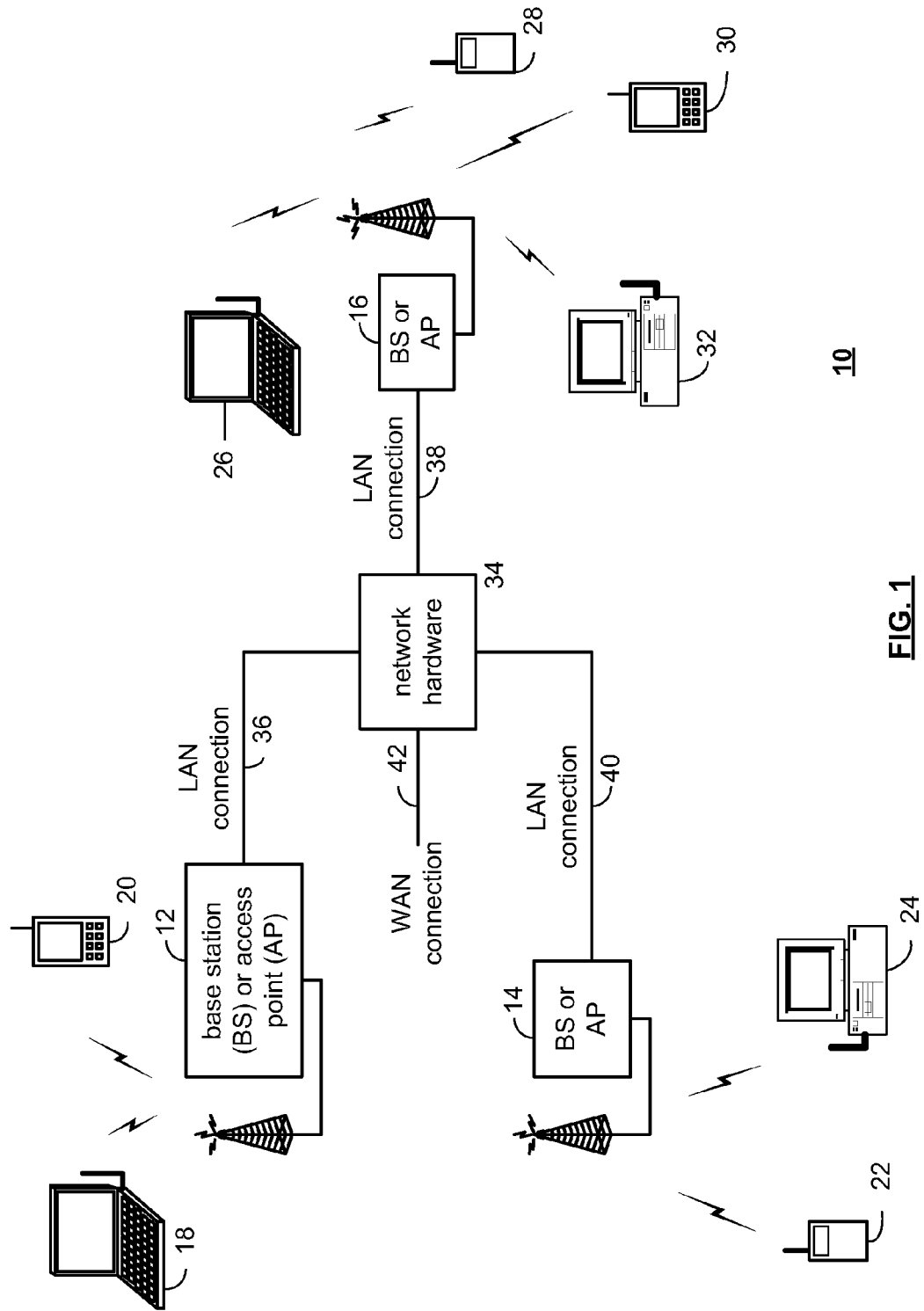
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
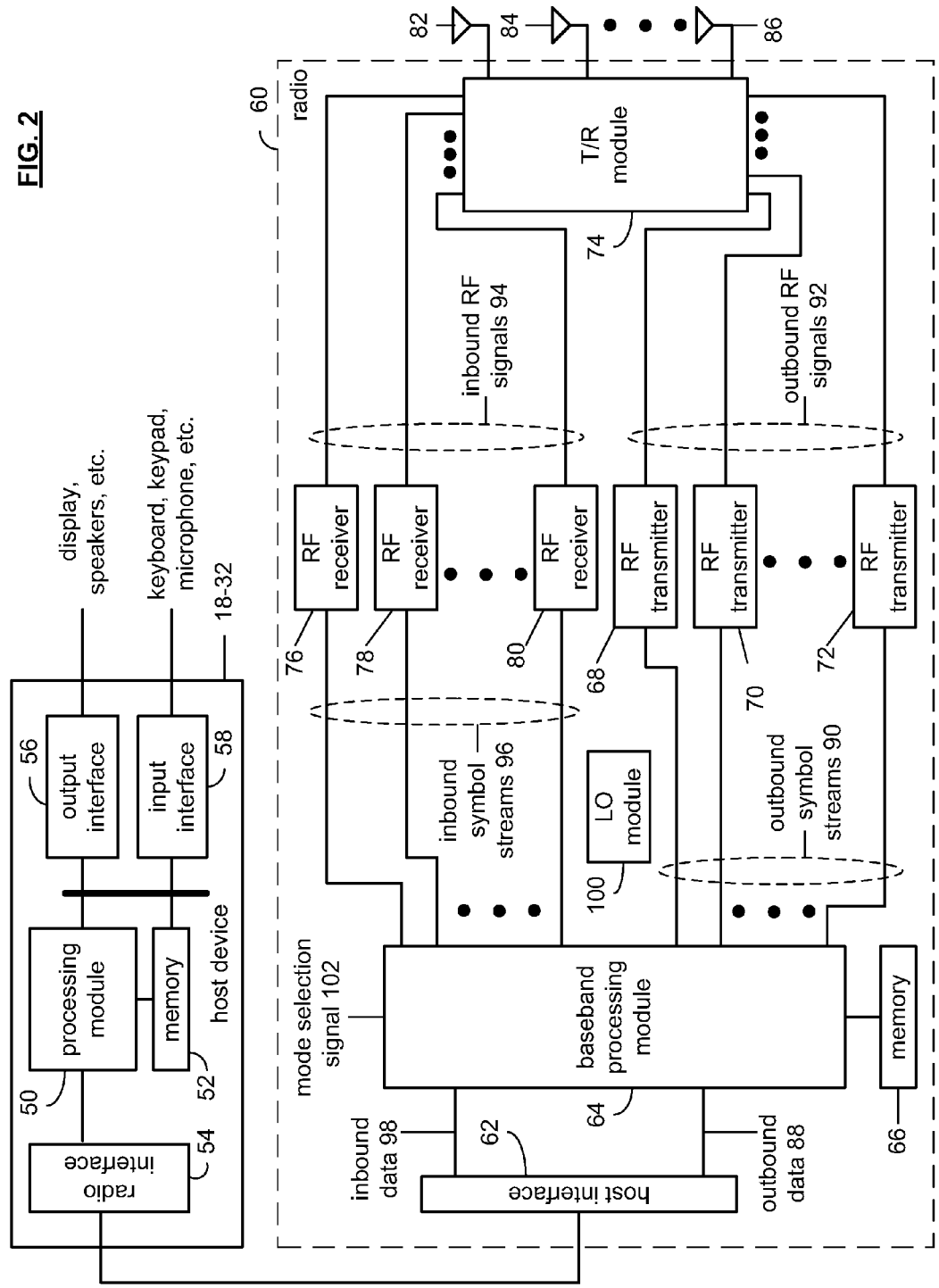
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
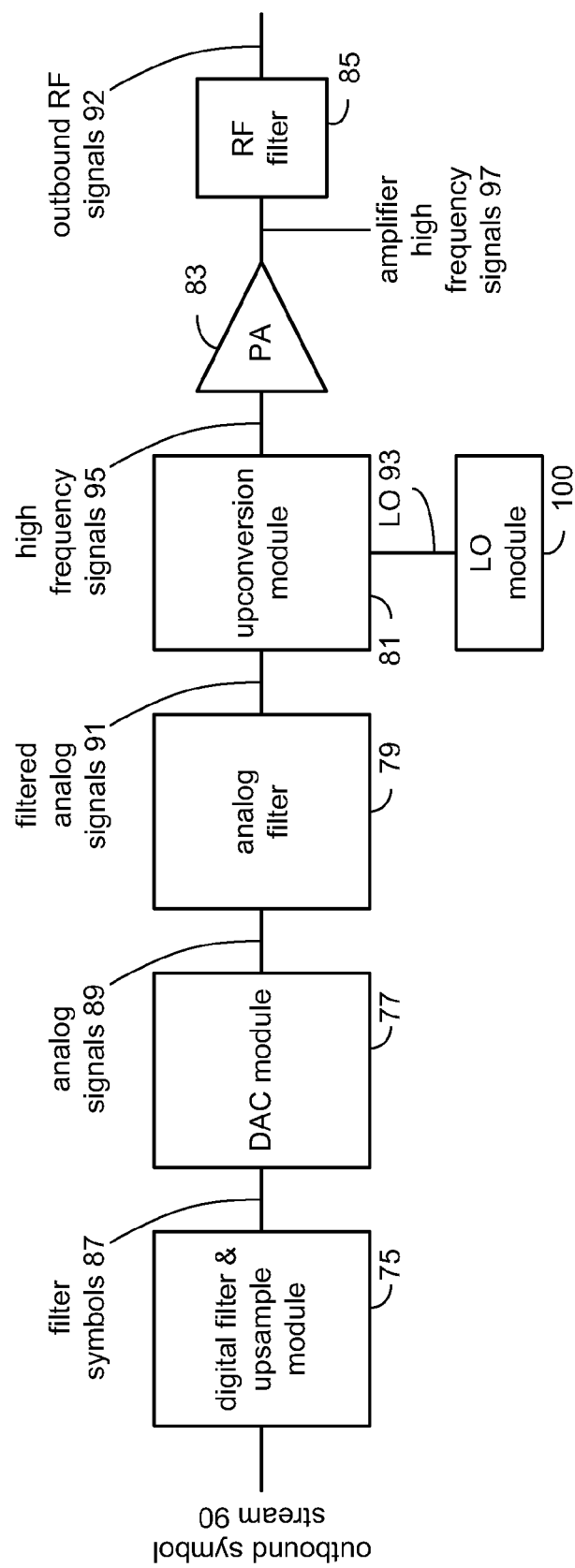
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
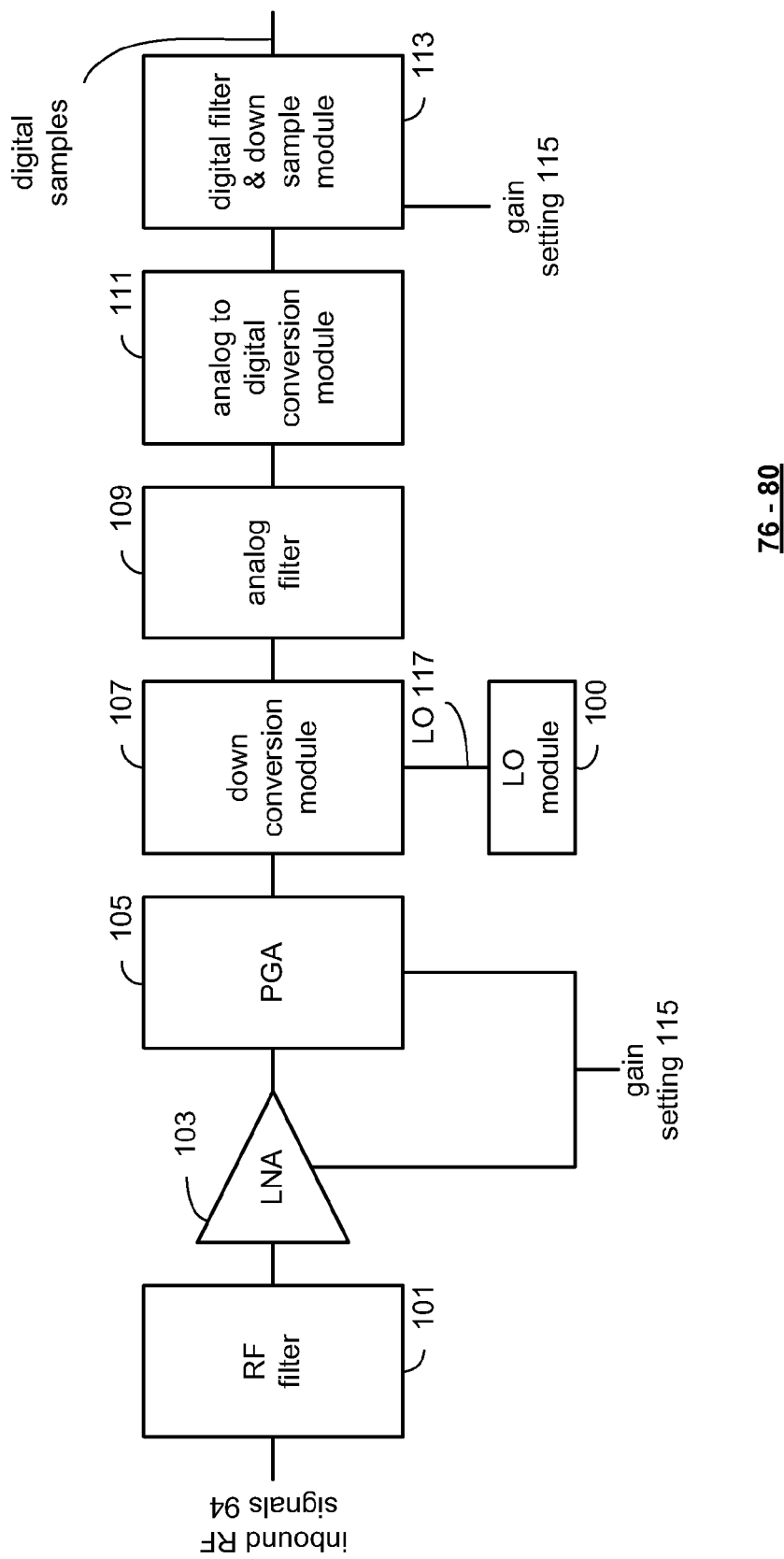
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
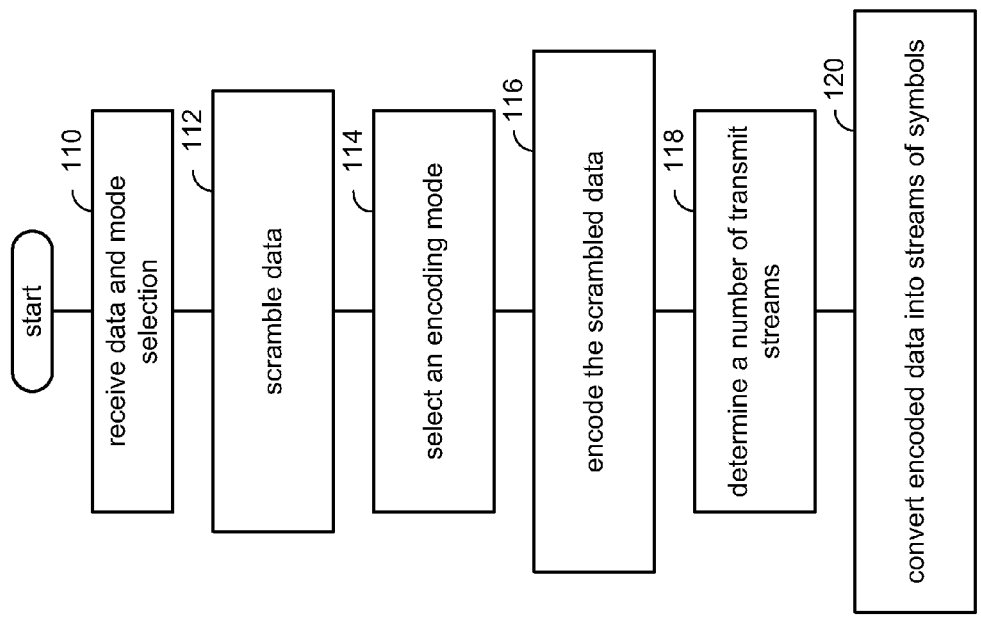
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
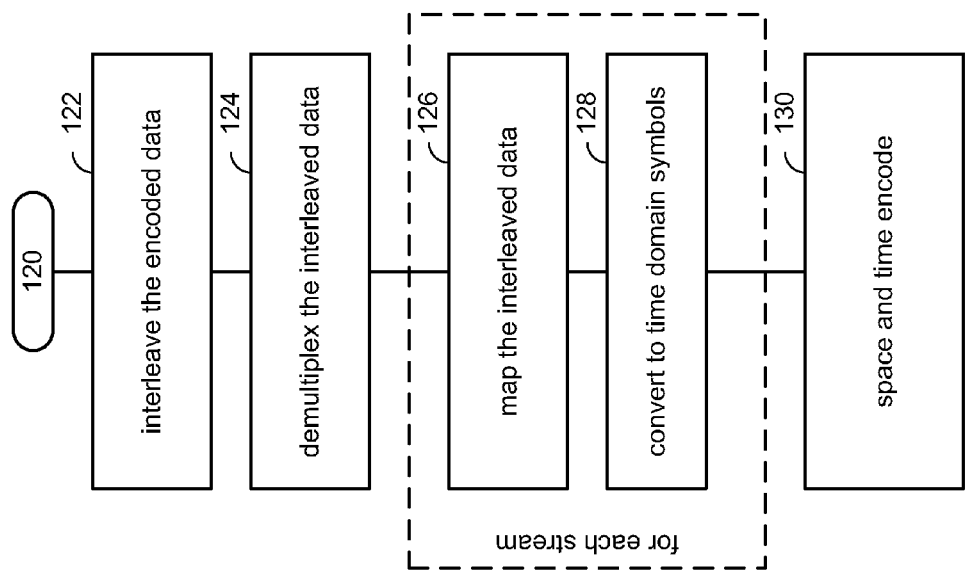
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
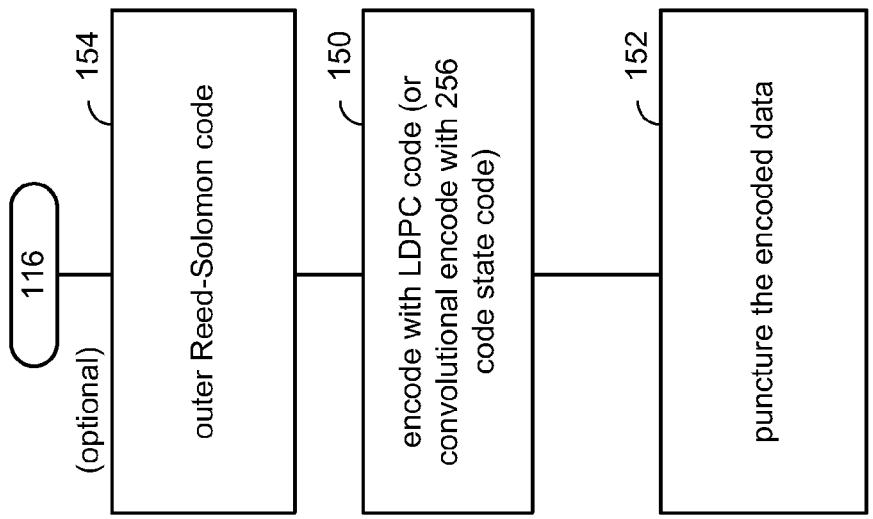
FIGS. 7-9 are diagrams illustrating various embodiments for encoding the scrambled data.
Figure 8:
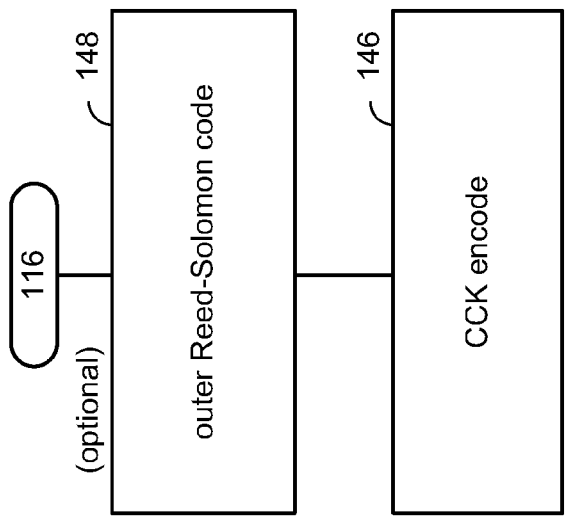
Figure 7:
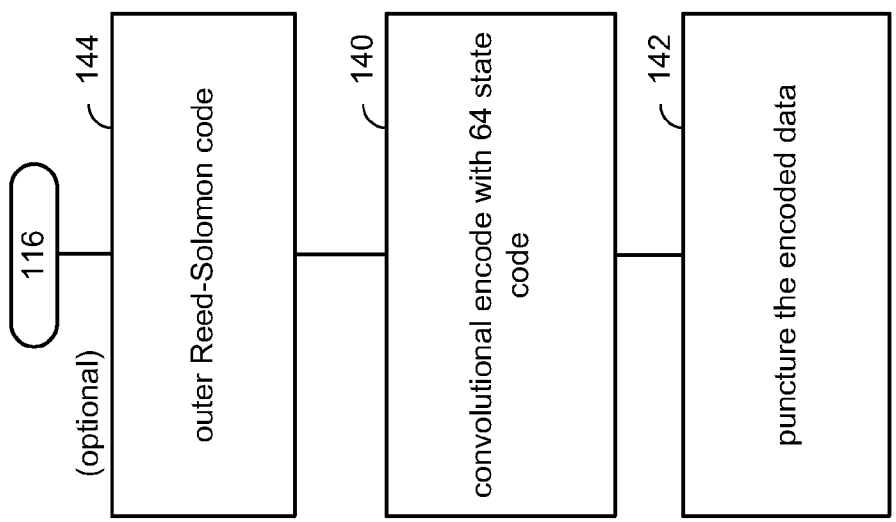

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
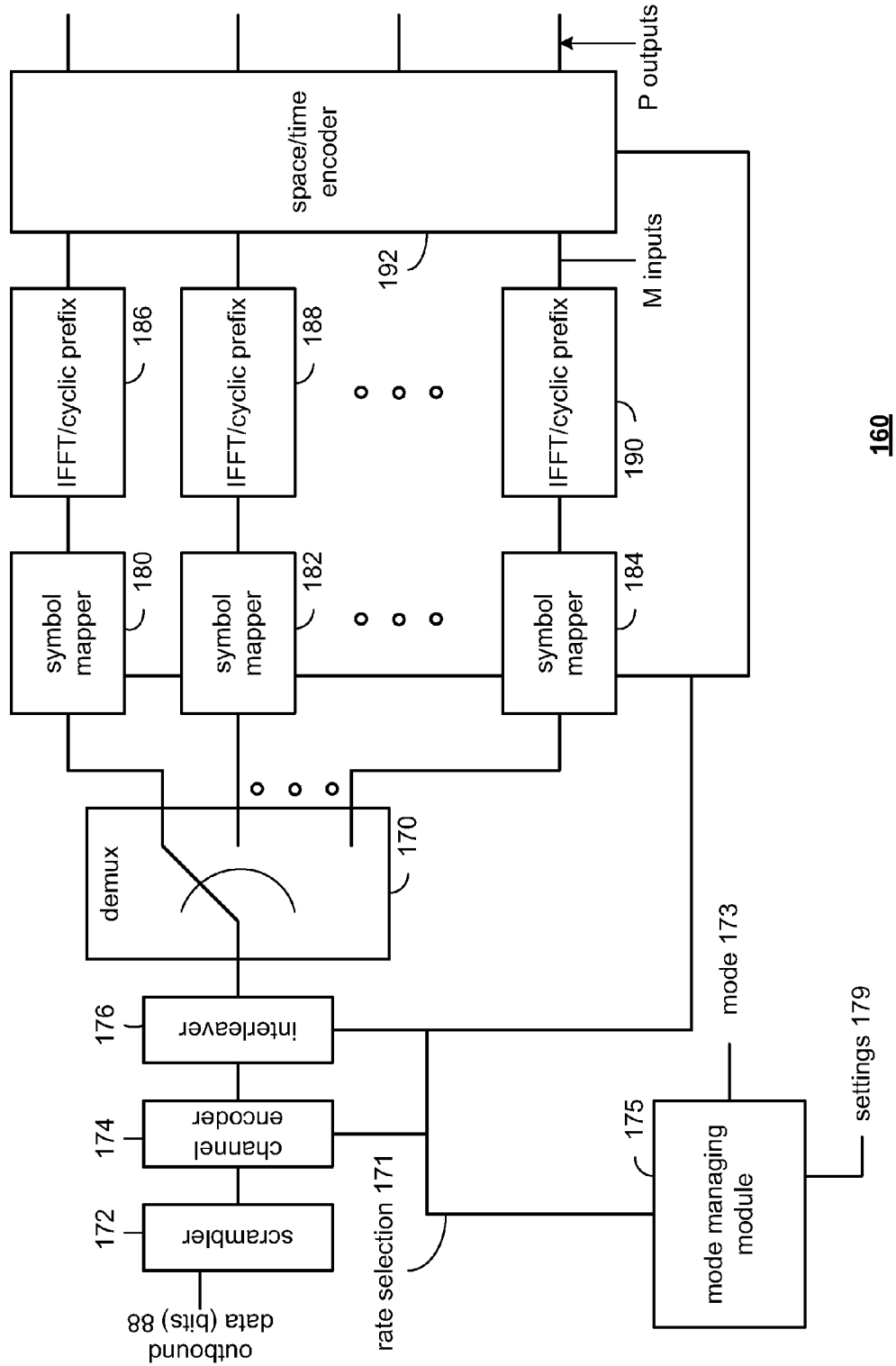
FIGS. 10A and 10B are diagrams illustrating embodiments of a radio transmitter.
Figure 10B:
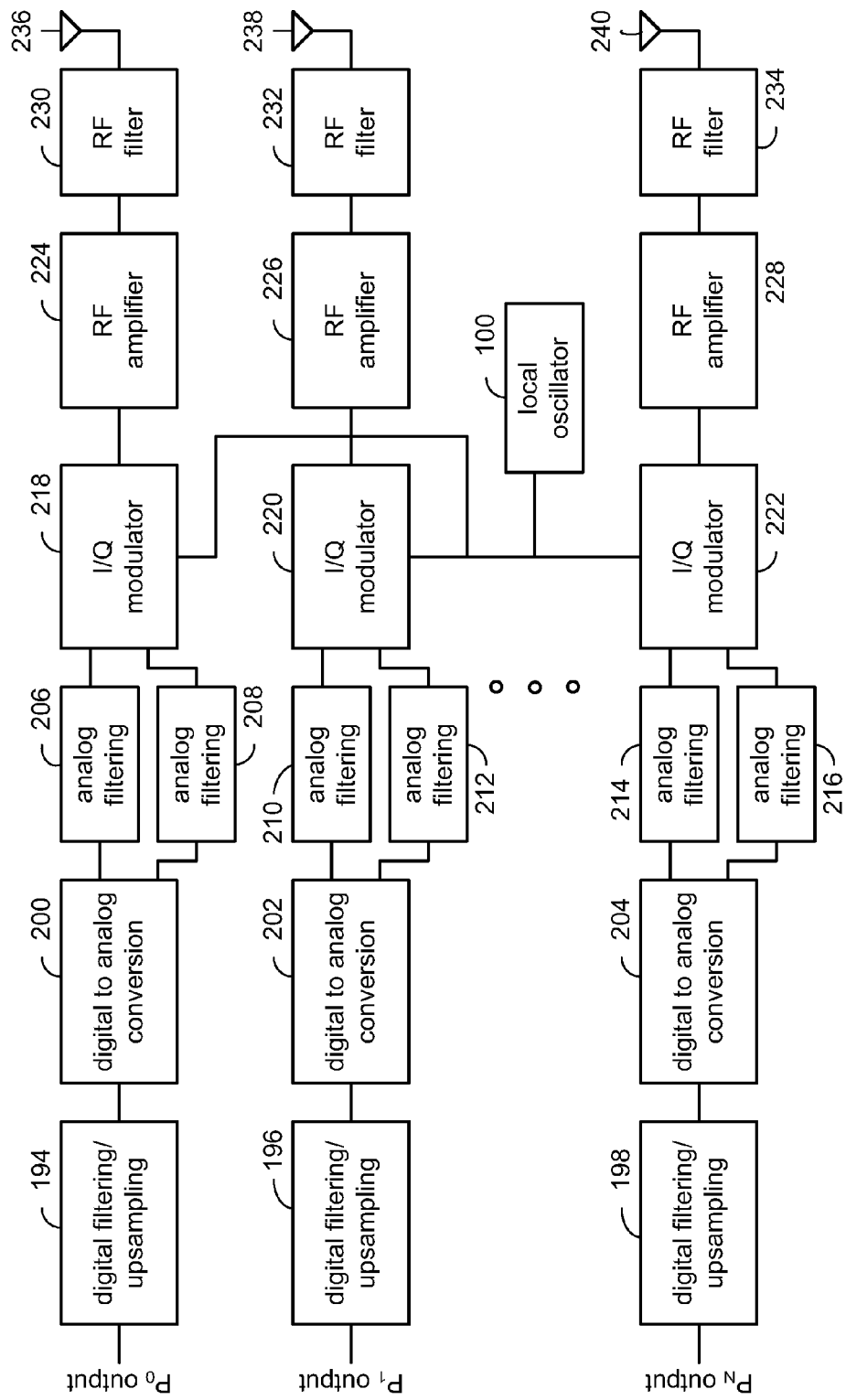

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \ldots & c_{2M-1} & c_{2M} \\ -c_2^* & c_1^* & -c_4^* & c_3^* & \ldots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
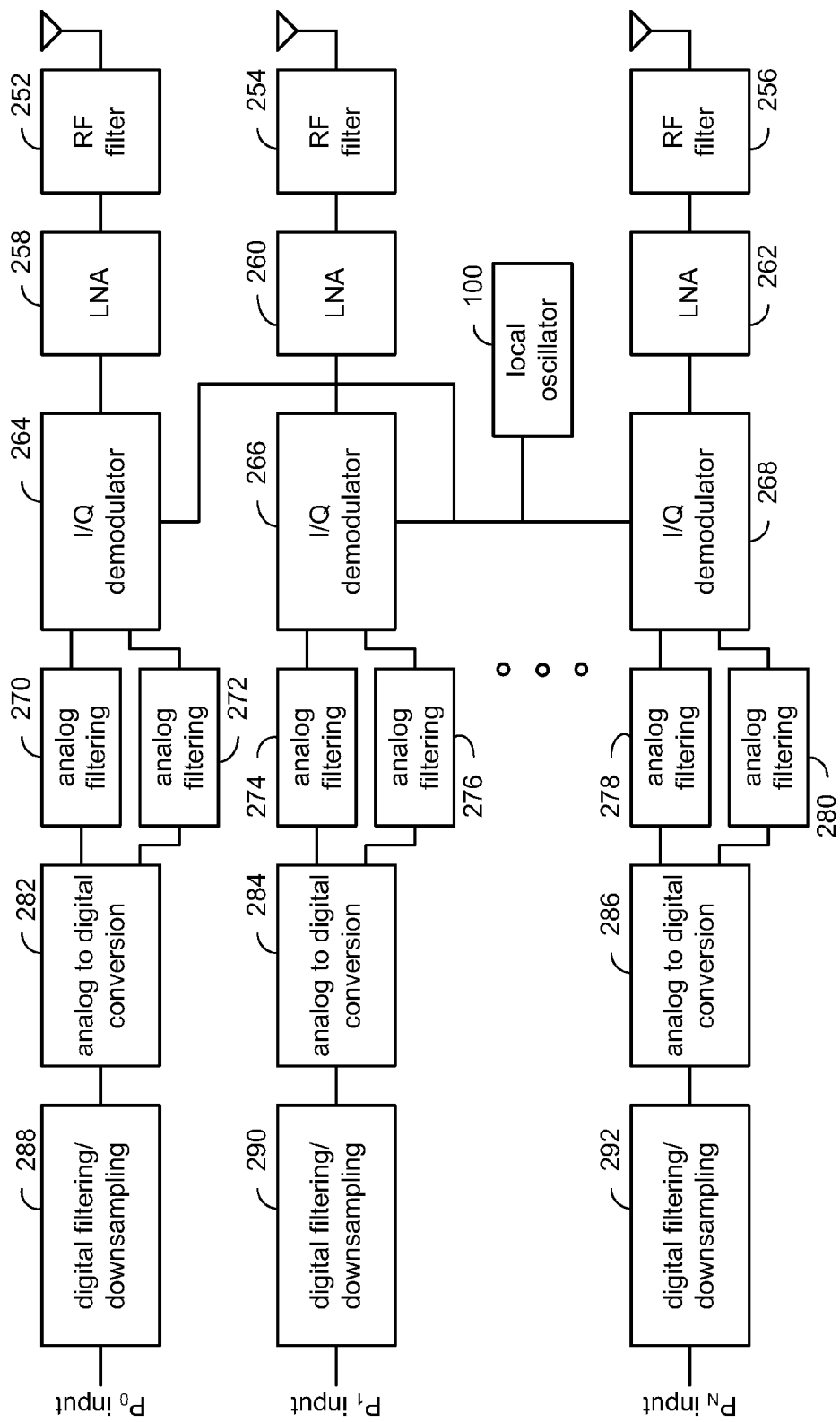
FIGS. 11A and 11B are diagrams illustrating embodiments of a radio receiver.
Figure 11B:
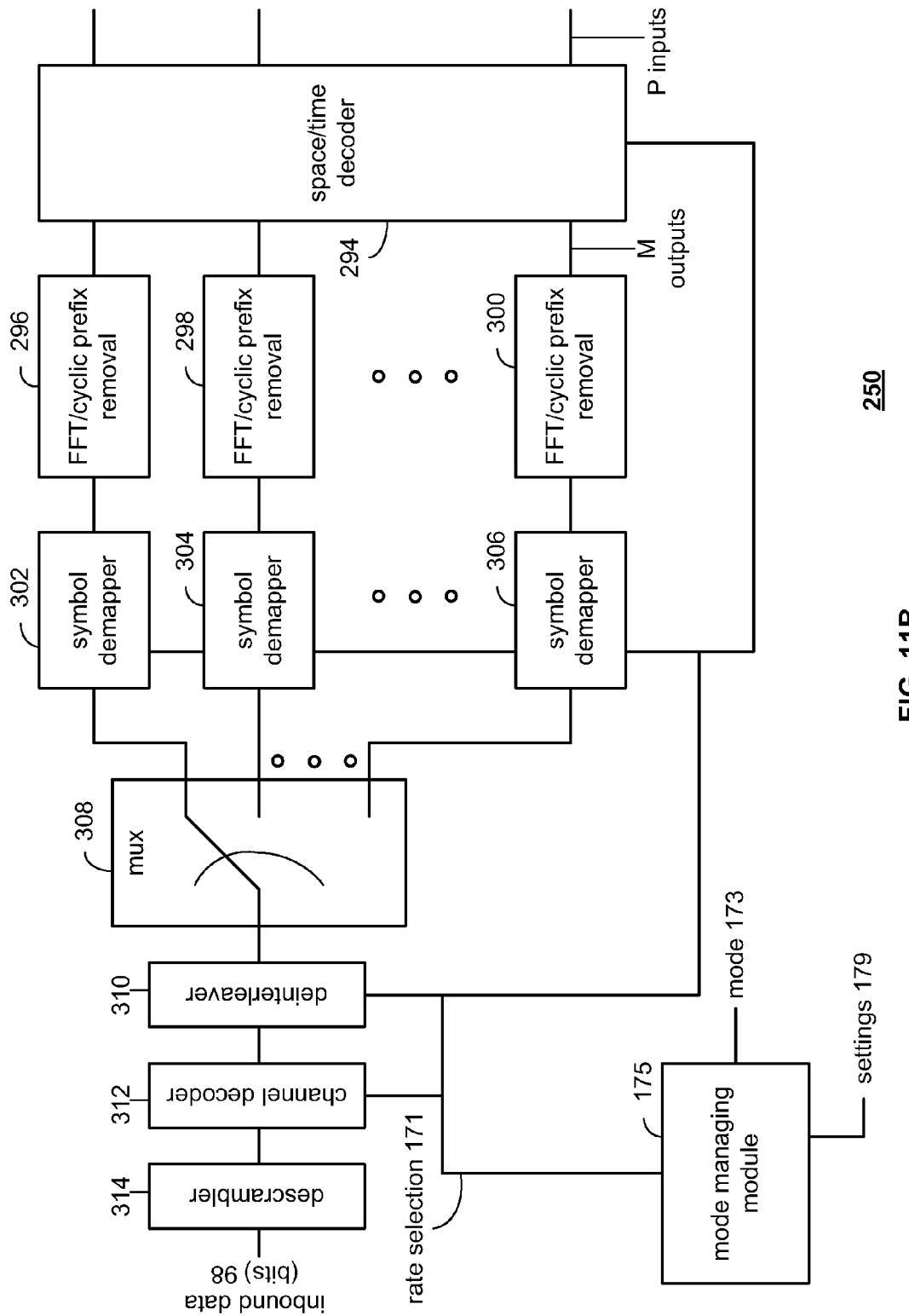

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
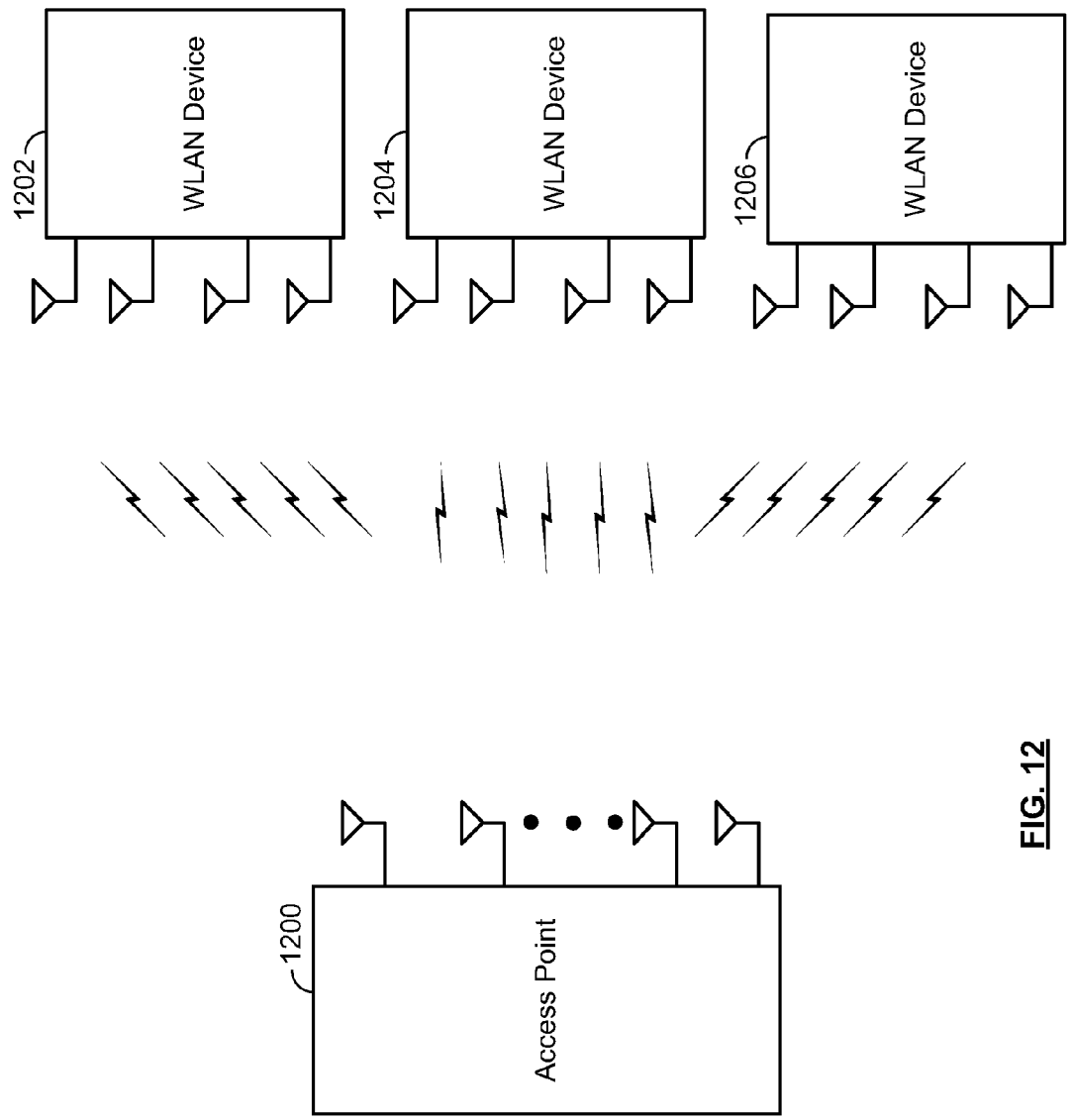
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of information transmitted to one or more receivers simultaneously in the time domain. Again, an OFDMA transmission sent to one user is equivalent to an OFDM transmission. A single MU-MIMO transmission may include spatially-diverse signals over a common set of tones, each containing distinct information and each transmitted to one or more distinct receivers. Some single transmissions may be a combination of OFDMA and MU-MIMO. MIMO transceivers illustrated may include SISO, SIMO, and MISO transceivers. The clusters employed for such communications may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments.

Figure 13:
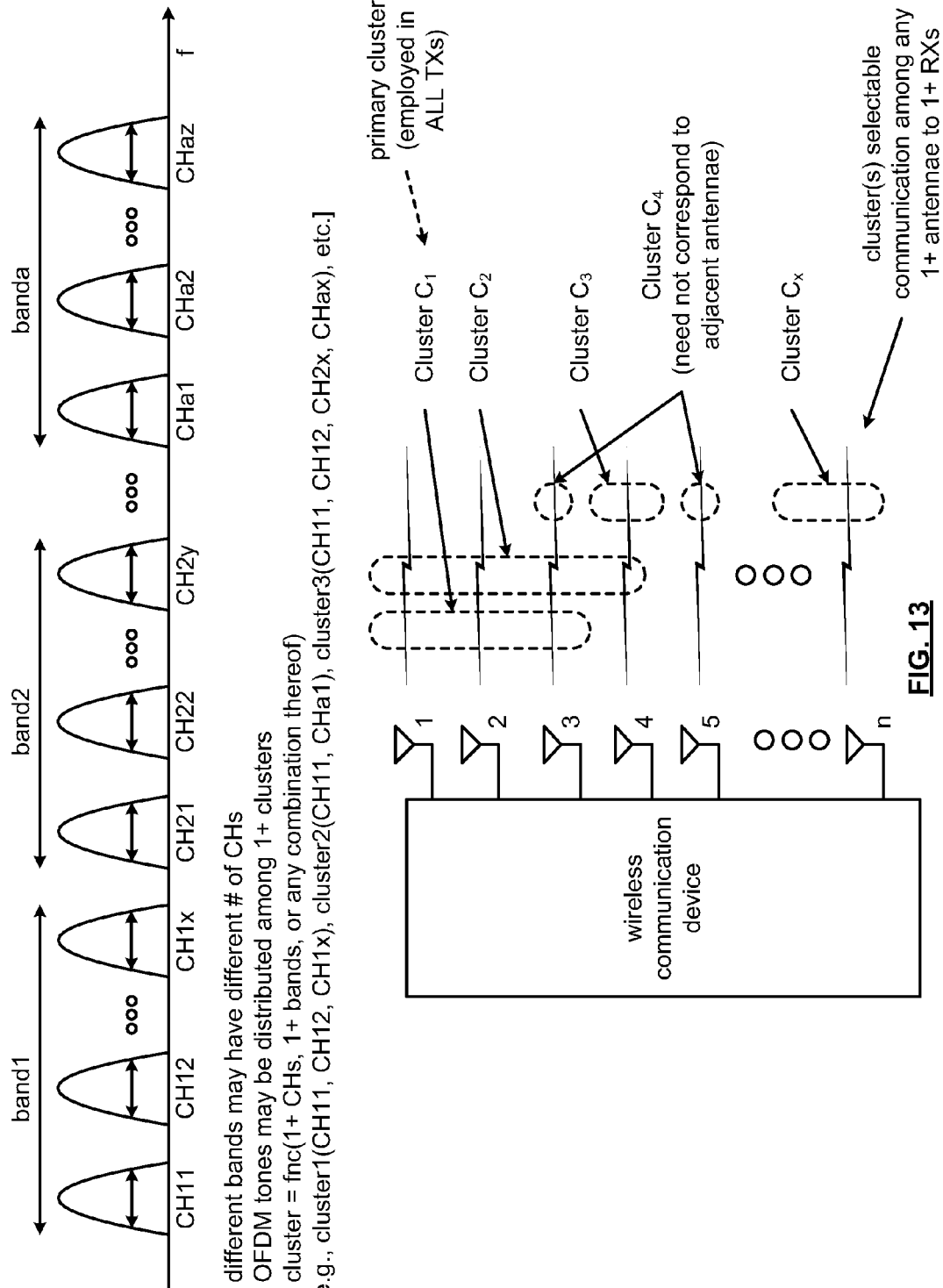
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Figure 14:
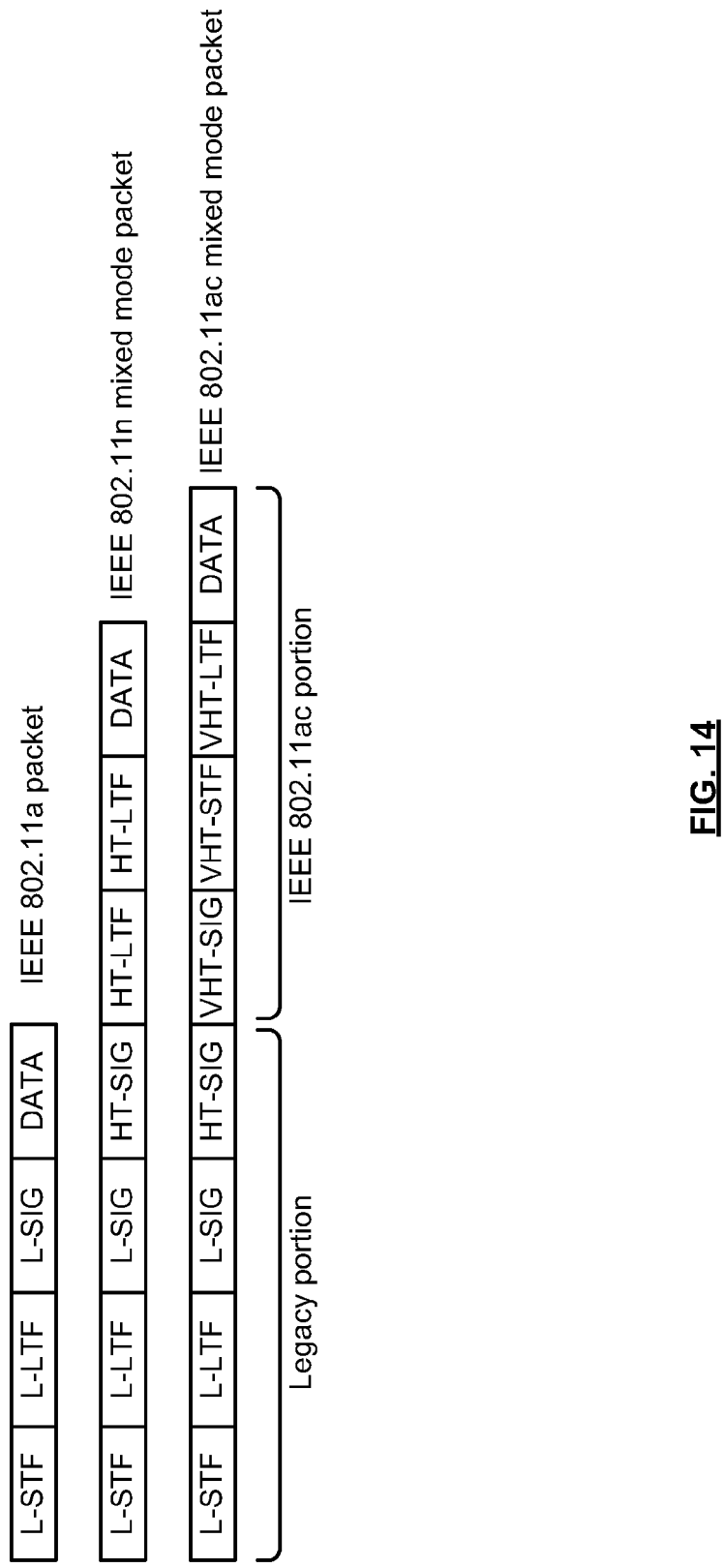
FIG. 14 is a diagram illustrating an embodiment of a frame format that may be used in conjunction with a wireless communication device such as a WLAN device.

FIG. 14 is a diagram illustrating an embodiment of a frame format that may be used in conjunction with a wireless communication device such as a WLAN device. Packet construction in accordance with the various principles presented herein, generally speaking, may include a preamble, a signal field, and a payload. Again, generally, the preamble is used for carrier acquisition, synchronization, channel estimation, etc. The signal field is used to communicate frame specific parameters (e.g., coding rate, frame length, etc.) to a receiving device. The payload is the data portion of the packet.

A frame format may be modified based on a number of parameters, including, dependence upon the presence of other wireless communication devices in a communication system. In some instances, a communication may include various types of wireless communication devices having different respective capability sets (e.g., legacy devices, newer devices, mixed mode devices, etc.).

For example, with some embodiments, in the 5 GHz spectrum, legacy devices may include those being compliant in accordance with IEEE 802.11(a) and IEEE 802.11(n). Legacy devices must be able to recognize that a packet has been transmitted and remain off the air for the duration of the packet (i.e., not transmit energy into the communication channel or communication medium in order to give access to other communication devices). Thus, packets formed in accordance with the various aspects presented herein may include certain portions therein that are compliant with legacy or prior standards, recommended practices, etc. As one example, a new packet may include a legacy preamble and a signal field along with a new, modified version of a payload. With such a novel packet structure, a legacy device will still be able to recognize the legacy preamble and decode the legacy signal field. The legacy signal field contains information that tells the legacy devices how long the packet will be on the air (i.e., occupy or be using the communication channel or communication medium). The legacy signal field does not contain IEEE 802.11 ac specific parameters (these are contained in the IEEE 802.11 ac signal field).

A packet having a particular type of frame format, such as a Greenfield packet that does not include certain portions therein that are compliant with legacy or prior standards, recommended practices, etc. (i.e., non legacy supporting), may be used when only new version devices are present (e.g., no legacy or prior devices having compatibility with previous standards and/or recommended practices). Such a packet structure (Greenfield) need not include a legacy compatible preamble or a legacy compatible signal field, since no such devices are present. The Greenfield packet may have a shorter preamble and a signal field that yields a higher throughput.

Referring particularly to FIG. 14, various packet structures are illustrated as being compliant with various IEEE 802.11x standards (e.g., where x is a, n, ac, respectively). An IEEE 802.11a packet is shown including a legacy short training field (L-STF), a legacy long training field (L-LTF), a legacy signal field (L-SIG), followed by a data field.

An IEEE 802.11n mixed mode packet is shown including a legacy short training field (L-STF), a legacy long training field (L-LTF), a legacy signal field (L-SIG), a high throughput signal field (HT-SIG), multiple high throughput long training fields (HT-LTF), followed by a data field.

An IEEE 802.11ac mixed mode packet is shown including a legacy short training field (L-STF), a legacy long training field (L-LTF), a legacy signal field (L-SIG), a high throughput signal field (HT-SIG), a very high throughput signal field (VHT-SIG), a very high throughput short training field (VHT-STF), a very high throughput long training field (VHT-LTF), followed by a data field.

As may be seen when comparing the various types of packets, the IEEE 802.11ac mixed mode packet does have some similarity with respect to the IEEE 802.11n mixed mode packet, as shown by a legacy portion (e.g., similar to the IEEE 802.11n mixed mode packet and having some similarity to the IEEE 802.11a packet) and an IEEE 802.11ac portion including the very high throughput portions.

The IEEE 802.11ac packet includes the IEEE 802.11a preamble and signal field for detection by devices compliant with and operable with IEEE 802.11a. Such a packet may have set a fixed rate of information of 6 Mbps and a corresponding length based on its respective time on the air (i.e., time being transmitted via the communication channel or communication medium). The IEEE 802.11ac mixed mode packet is limited to the time on the air (channel/medium) corresponding to the maximum size of an IEEE 802.11a packet.

The IEEE 802.11ac mixed mode packet includes the IEEE 802.11n preamble and signal field for detection by devices compliant with and operable with IEEE 802.11n. When using the structure that is compatible with devices compliant with and operable with IEEE 802.11n, the rate is set to modulation code set (MCS) 0, regular Guard Interval (GI), no space time block coding (STBC), and a corresponding length based on time on air (channel/medium).

As will be seen in various embodiments, the HT-SIG field need not be employed in all embodiments (e.g., several embodiments do not use such a HT-SIG field). When an HT-SIG field is employed in a particular embodiment, it may be necessary for such a HT-SIG cyclic redundancy check (CRC) to be valid so that HT device accepts the signal field and defers the medium (i.e., does not occupy the channel/air). In the bottom embodiment of this diagram, the structure includes the VHT-SIG field shown as being immediately after such a HT-SIG field. The VHT-SIG field is 90 degrees rotated with respect to HT-STF field to allow for better discrimination between the two respective fields. Other rotations (e.g., besides only 90 degrees) are alternatively and also possible to assist in such discrimination as preferred in other embodiments. As such, the probability of considering the HT-SIG field (when employed in a given embodiment) and thereby treating a VHT mixed mode frame as in fact being a valid HT frame should be relatively small. This problem typically occurs when an HT device finds its MAC address and the frame check sequence (FCS) passes in its decoding of an IEEE 802.11ac mixed mode frame. The VHT short training field (VHT-STF), VHT long training field (VHT-LTF), and payload data portion all follow VHT-SIG field in the 802.11 ac mixed mode packet.

With respect to a signal field (SIG) as employed within such multi-user packets as described herein, or variants thereof, the SIG field may be distributed or partitioned into at least two separate signal fields (e.g., SIG A and SIG B) that are located in different portions of the multi-user packet. In certain embodiments, a first SIG field (e.g., SIG A) may be implemented in a portion of a multi-user packet that corresponds to a first operational mode (e.g., a legacy operational mode), and a second SIG field (e.g., SIG B) may be implemented in a portion of a multi-user packet that corresponds to a second operational mode (e.g., an IEEE 802.11ac (VHT) operational mode).

It is noted, that while the terminology of a multi-user packet is used in various embodiments herein and in accordance with various aspects of the invention, such a packet may also support single user (SU) operation (e.g., such as in accordance with single user multiple input multiple output (SU-MIMO) in certain embodiments. The terminology of multi-user packet is nonetheless employed herein because such a format of a packet can be simultaneously compliant with and adapted to both single user (SU) and multi-user (MU) operation (e.g., multi-user multiple input multiple output (MU-MIMO), orthogonal frequency division multiple access (OFDMA), or combination OFDMA/MU-MIMO).

A first of the SIG fields includes information that may be processed and decoded by all wireless communication devices within a communication system, and a second of the SIG fields includes information that is specific to one or more particular wireless communication devices within the communication system (e.g., pertaining to a specific once or more wireless communication devices, such as a specific, individual wireless communication device or a specific subset or group of the wireless communication devices within the communication system).

With respect to a given packet, certain of the wireless communication devices may receive, process and decode the first of the SIG fields (e.g., SIG A) and the second of the SIG fields (e.g., SIG B) within a distributed SIG field, while other of the wireless communication devices may only receive the first of the SIG fields (e.g., SIG A) (e.g., such as if any precoding (steering) multi-user (MU) weights do not correspond to those respective wireless communication devices). For example, legacy wireless communication devices (i.e., devices that are compliant with an older version of a wireless communication standard) having such a capability would then not process and decode both the first of the SIG fields (e.g., SIG A) and the second of the SIG fields (e.g., SIG B) within a distributed SIG field. Generally speaking, multiple or all of the receiving wireless communication devices are typically operative to process and decode a first component of the distributed SIG field (e.g., SIG A), and those wireless communication devices for which the second portion is intended (e.g., those for which the precoding (steering) multi-user (MU) weights correspond) would then be operative to receive, process and decode both the first of the SIG fields (e.g., SIG A) and the second of the SIG fields (e.g., SIG B) within a distributed SIG field.

Again, it is a noted that while the first component of the distributed SIG field (e.g., SIG A) may be able to be processed and decoded by most or all of the receiving wireless communication devices, all of those receiving wireless communication devices may not necessarily use any or all of the information therein (e.g., such a receiving wireless communication device may operate by discarding all of part of the multi-user packet).

With respect to the locations of such a first component of the distributed SIG field (e.g., SIG A) and as second component of the distributed SIG field (e.g., SIG A), a designer is given wide latitude regarding their respective locations within such a multi-user packet. The precise locations of the at least first and second SIG fields within a multi-user packet may be varied. For example, particular where a first SIG field (e.g., SIG A) and a second SIG field (e.g., SIG B) are located may vary per application, by design or implementation choice, etc. For example, in some embodiments, the second component of the distributed SIG field (e.g., SIG B, including user-specific information) is located before a data field in the multi-user packet and at least one additional field is located between the second component of the distributed SIG field (e.g., SIG B) and the data field (e.g., in which one or more VHT-LTFs are located in between the second component of the distributed SIG field (e.g., SIG B) and the data field). In another embodiment, the second component of the distributed SIG field (e.g., SIG B, including user-specific information) is located adjacent to and preceding a data field in the multi-user packet.

Also, within certain embodiments, the manner in which the various components of the distributed SIG field may be transmitted from a wireless communication device differently. For example, a first component of the distributed SIG field (e.g., SIG A) may be transmitted omni-directionally from a transmitting wireless communication device, while a second component of the distributed SIG field (e.g., SIG B) may be transmitted from a transmitting wireless communication device in accordance with pre-coding or beamforming. In other words, the manner of transmission may be modified as a function of various components within a multi-user packet (e.g., a first portion transmitted in accordance with a first manner, and a second portion transmitted in accordance with a second manner). Such variable transmission functionality (e.g., SIG A omni-directionally and SIG B in accordance with pre-coding or beamforming) may be operative to ensure that all of the receiving wireless communication devices are able to receive and process a first portion of the distributed SIG field that includes information that may be used by multiple of the wireless communication devices (e.g., SIG A), while a second portion of the distributed SIG field (e.g., SIG B) is targeted for and processed only by those wireless communication devices for which the second portion of the distributed SIG field (e.g., SIG B) is intended. In one embodiment, such pre-coding or beamforming as may be performed for the second portion of the distributed SIG field (e.g., SIG B) may be in accordance with space division multiple access (SDMA) signaling; such SDMA may be targeted to one or more of the receiving wireless communication devices.

Different formats of such multi-user packet may be employed to effectuate the respective and different operational modes of single user (SU), multi-user (MU) resolvable LTFs, and MU non-resolvable LTFs operational modes. For example, the preamble structure may vary for each of these various operational modes (the SU, MU resolvable LTFs, and MU non-resolvable LTFs operational modes). In some instances, having different frame formats for each respective operational mode may yield a more efficient (e.g., shorter) preamble structure for some of the cases. However, for other of the cases, there may be an increase in complexity (e.g., VHT devices oftentimes need to handle multiple frame formats, and would then need to accommodate the multiple frame formats being employed). To ensure a more simplistic and less complex approach, a common or same frame format may be employed in some embodiments.

When employing different types of frame formats, indicating which preamble is being used in a particular instance may be signaled in one of the fields of the multi-user packet (e.g., in the first component of the distributed SIG field, VHT-SIG-A field using one or more of the following (or equivalent) bits: MU-MIMO bit, and VHT-LTF Mode bit.

In some embodiments, a HT-SIG field may be inserted after the L-SIG field for proper deferral of HT devices (e.g., IEEE 802.11n devices). In alternative embodiments, the first component of the distributed SIG field (e.g., VHT-SIG-A) may be replaced by HT-SIG for proper deferral of HT devices (e.g., IEEE 802.11n devices).

When operating in accordance with SU-MIMO, beamforming and precoding (steering) may also be employed when transmitted such multi-user packets (e.g., such as in accordance with certain portions of the IEEE 802.11n specification). It is noted that, when operating in accordance with SU-MIMO, the first of the SIG fields (e.g., SIG A) may include all of the necessary information for processing and decoding at least one field within the multi-user packet (e.g., the second of the SIG fields (e.g., SIG B) may include no such relevant and useful information therein for use in processing and decoding at least one field within the multi-user packet).

Figure 15:
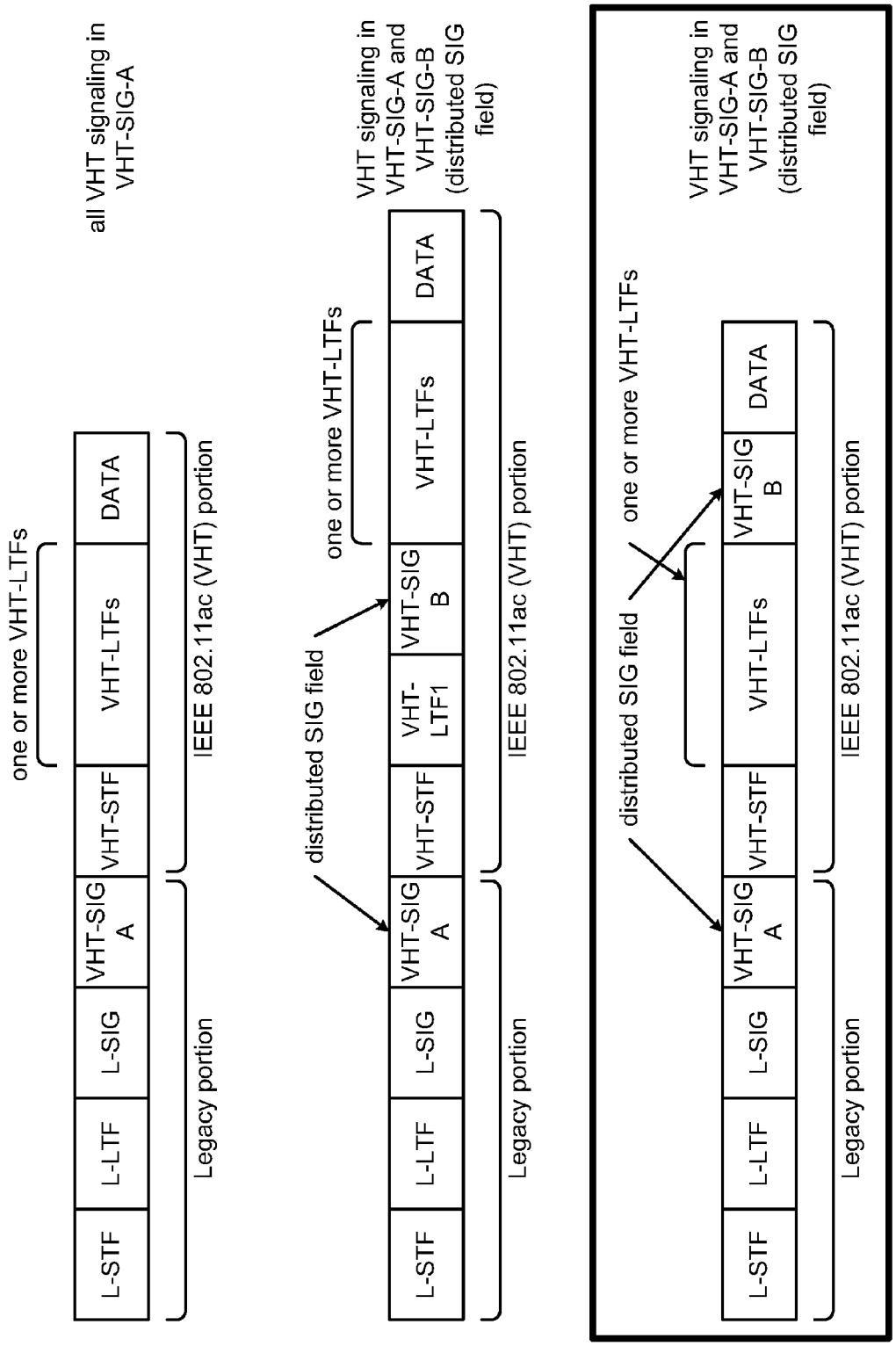
FIG. 15 is a diagram illustrating an embodiment of possible frame formats, corresponding to single user multiple input multiple output (SU-MIMO), that may be used in conjunction with a wireless communication device such as a WLAN device.

FIG. 15 is a diagram illustrating an embodiment of possible frame formats, corresponding to single user multiple input multiple output (SU-MIMO), that may be used in conjunction with a wireless communication device such as a WLAN device. This diagram shows three possible arrangements of the respective fields within a frame that may be used in accordance with SU-MIMO operations.

Figure 16:
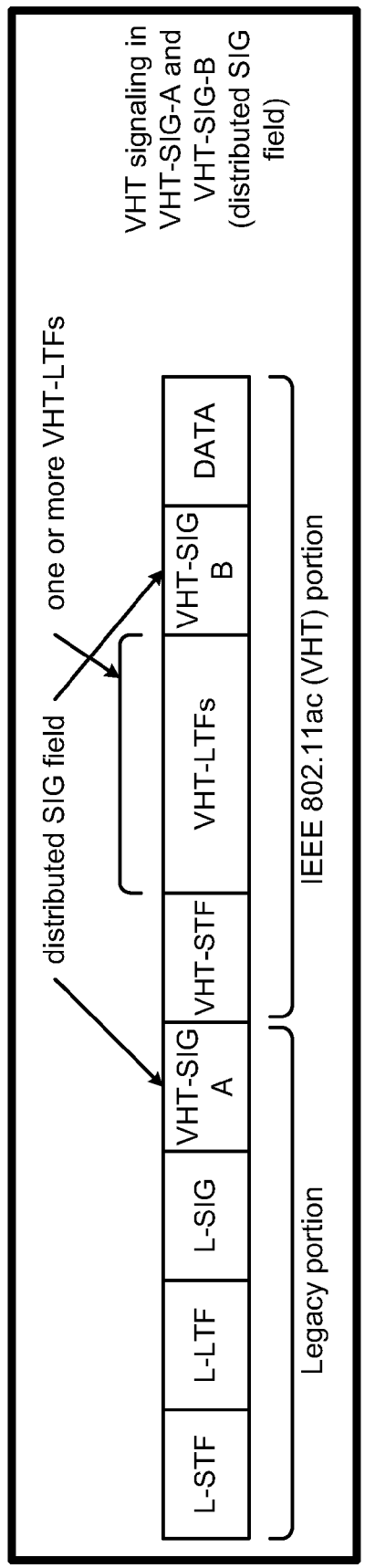
FIG. 16 is a diagram illustrating an embodiment of a possible frame format, corresponding to multi-user multiple input multiple output (MU-MIMO) and particularly in accordance with a resolvable operational mode (e.g., resolvable VHT-LTFs mode), that may be used in conjunction with a wireless communication device such as a WLAN device.

FIG. 16 is a diagram illustrating an embodiment of a possible frame format, corresponding to multi-user multiple input multiple output (MU-MIMO) and particularly in accordance with a resolvable operational mode (e.g., resolvable VHT-LTFs mode), that may be used in conjunction with a wireless communication device such as a WLAN device. This diagram shows a possible arrangements of the respective fields within a frame that may be used in accordance with MU-MIMO operations when operating in accordance with a resolvable operational mode (e.g., a resolvable LTFs operational mode) in which the communication channel corresponding to each respective wireless communication device may include precoding (steering) weights which may be estimated at each wireless communication device (e.g., each respective wireless communication device may obtain additional information about other wireless communication devices present in the same MU frame; such additional information may correspond to other user's precoding (steering) weights that may be present within the same MU frame). Such additional information about other wireless communication devices present in the same MU frame (e.g., other user's precoding (steering) weights) may be employed for performing interference cancellation and/or suppression based on interference such as may be caused by one or more of the other wireless communication devices within the communication system.

Moreover, it is noted that, when operating in accordance with such a resolvable operational mode (e.g., a resolvable LTFs operational mode), a modified or slightly longer preamble may be desirable in that a slightly greater number of LTFs may be required.

Figure 17:
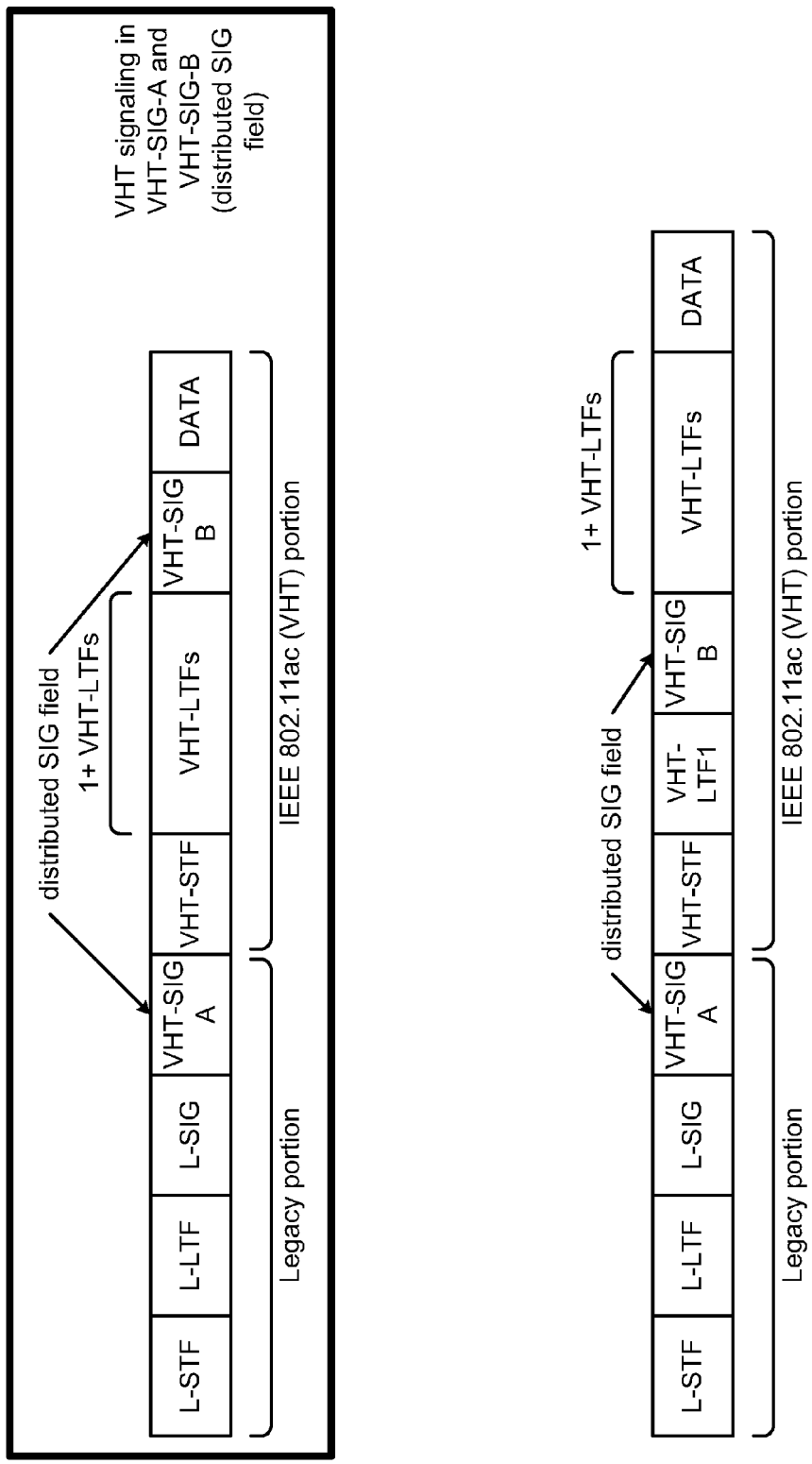
FIG. 17 is a diagram illustrating an embodiment of possible frame formats, corresponding to multi-user multiple input multiple output (MU-MIMO) and particularly in accordance with a non-resolvable operational mode (e.g., non-resolvable VHT-LTFs mode), that may be used in conjunction with a wireless communication device such as a WLAN device.

FIG. 17 is a diagram illustrating an embodiment of possible frame formats, corresponding to multi-user multiple input multiple output (MU-MIMO) and particularly in accordance with a non-resolvable operational mode (e.g., non-resolvable VHT-LTFs mode), that may be used in conjunction with a wireless communication device such as a WLAN device. This diagram shows two possible arrangements of the respective fields within a frame that may be used in accordance with MU-MIMO operations when operating in accordance with a non-resolvable operational mode (e.g., a non-resolvable LTFs operational mode) in which each respective wireless communication device is operative to estimate only the intended communication channel (e.g., corresponding to that particular wireless communication device), and may also include employing precoding (steering) weights to all or specific portions of the multi-user packet. It is noted that, when operating in accordance with such a non-resolvable operational mode (e.g., a non-resolvable LTFs operational mode), a relatively shorter preamble may be employed having a fewer number of LTFs than may be required when operating in accordance with a resolvable operational mode (e.g., a resolvable LTFs operational mode).

As mentioned elsewhere herein, the respective components of a distributed SIG field (e.g., SIG A and SIG B) may be located differently within different embodiments. Some embodiments place the second component of the distributed SIG field (e.g., SIG B) is located before a data field in the multi-user packet and at least one additional field is located between the second component of the distributed SIG field (e.g., SIG B) and the data field (e.g., in which one or more VHT-LTFs are located in between the second component of the distributed SIG field (e.g., SIG B) and the data field). In other embodiments, the second component of the distributed SIG field (e.g., SIG B, including user-specific information) is located adjacent to and preceding a data field in the multi-user packet.

Figure 18:
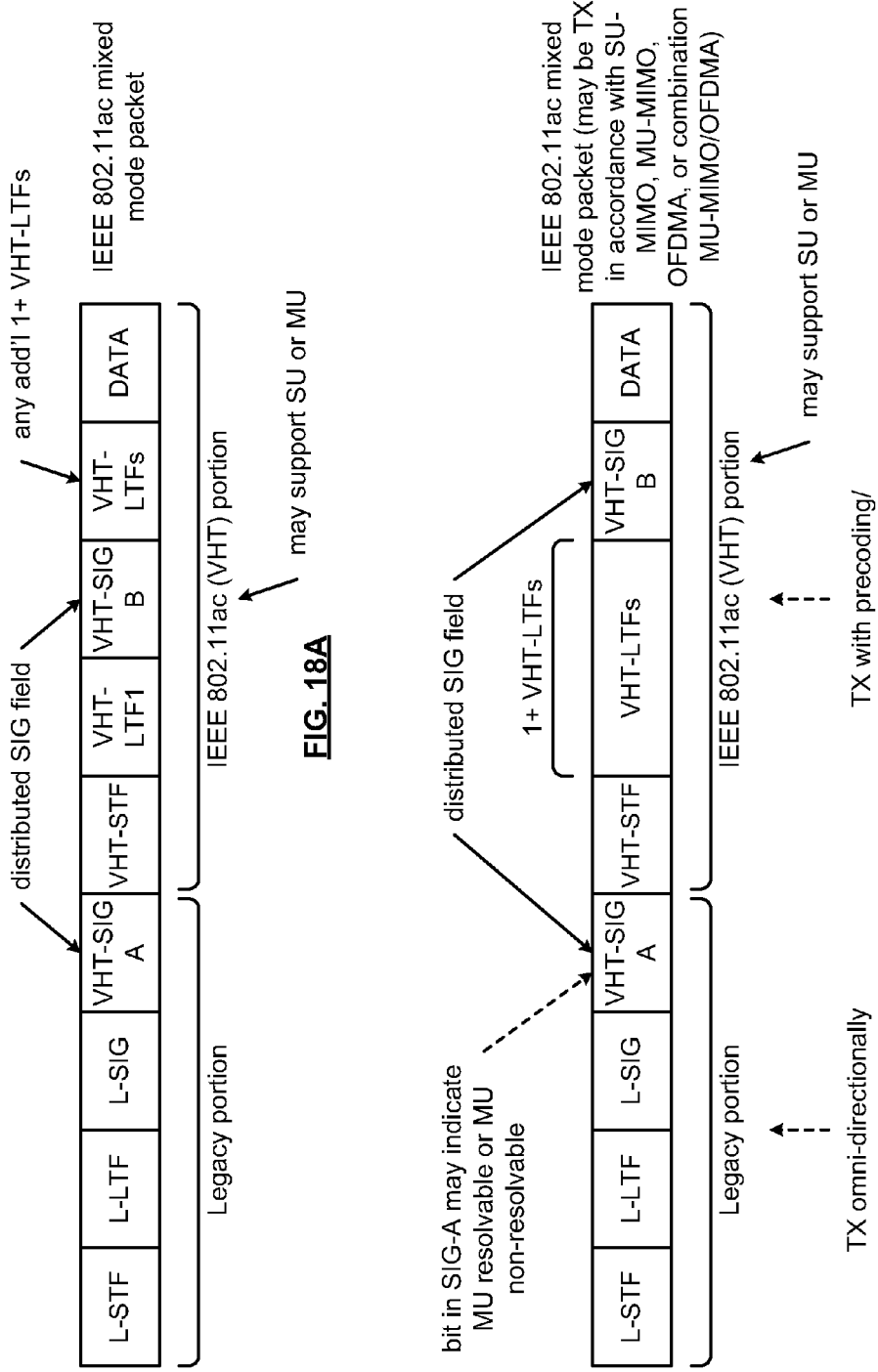
FIG. 18A and FIG. 18B are diagrams illustrating embodiments of a frame format, showing a distributed SIG field, that may be used in conjunction with a wireless communication device such as a WLAN device.

FIG. 18A and FIG. 18B are diagrams illustrating embodiments of a frame format, showing a distributed SIG field, that may be used in conjunction with a wireless communication device such as a WLAN device.

As can be seen with respect to each of the possible options for each of the SU, MU Resolvable LTFs, and MU Non-Resolvable LTFs preamble, there is one frame format that is common among each operational mode (e.g., as shown in FIG. 18B); this common frame format may be selected and be employed for supporting each of the respective operational modes. As such, all of the wireless communication devices may be implemented to accommodate this common frame format to ensure that a relatively lower complexity may be achieved for those wireless communication devices in which it is desired to support multiple operational modes.

Again, it is noted that a particular preamble structure may be selected such that the structure is similar or the same for all cases in order to provide a lower implementation complexity, while considering that some preambles in this vein may be less efficient (e.g., longer). Alternatively, a particular preamble structure may be selected such that the structure is different for some or all of the cases, while considering that such implementations may provide for a higher implementation complexity yet allow for the use of more efficient preambles (e.g., shorter).

Selecting operation in accordance with a single MU preamble (e.g., such as within FIG. 18B may be beneficial in a preferred embodiment by providing for the reduced complexity among the various wireless communication devices within the communication system. As can be seen when selecting such a common format for the multi-user packet (e.g., FIG. 18B), such a frame format allows for operation in accordance with either the MU resolvable LTFs operational mode or the MU non-resolvable LTFs operational mode. In some instances, the VHT-LTF mode bit may not be required.

The frame format as depicted in FIG. 18B is an embodiment of a unified SU/MU-MIMO 802.11ac legacy mixed mode packet structure. Such a single multi-user packet structure is operative to support each of the various operational modes: single user (SU) as well the two operational modes of multi user (MU) resolvable operational mode (e.g., a resolvable LTFs operational mode) and a non-resolvable operational mode (e.g., a non-resolvable LTFs operational mode). Selecting one multi-user packet structure allows for a simpler solution and less complexity than trying to implement different and respective types of multi-user packet structures for the different, respective operational modes.

Again, the packet (preamble) structure of the multi-user packet in FIG. 18B is operative to support the two MU operational modes. If desired, the mode type may be indicated in the first component of the distributed SIG field (e.g., VHT-SIG-A, using a single bit, such as in accordance with "VHT-LTF Mode" indication). Again, these two MU operational modes may be the MU resolvable LTFs operational mode and the MU non-resolvable LTFs operational mode. The MU resolvable LTFs operational mode may operate such that each respective wireless communication device each respective wireless communication device may obtain additional information about other of the wireless communication devices present in the same MU frame (e.g., other user's precoding (steering) weights that may be present within the same MU frame), which may result in a longer preamble (e.g., a greater number of VHT-LTFs may be required).

The MU non-resolvable LTFs operational mode may operate in accordance with each respective wireless communication device performing channel estimation of only the intended respective communication channel (e.g., corresponding to that particular wireless communication device). The MU non-resolvable LTFs operational mode may include some precoding (steering) weights as well, and can provide for a shorter preamble length than as required in accordance with the MU resolvable LTFs operational mode.

In accordance with both of these modes (e.g., MU resolvable LTFs operational mode and MU non-resolvable LTFs operational mode), both operational modes have common portion (e.g., VHT-SIG-A) and a user specific portion of the distributed SIG field (e.g., VHT-SIG-B). Some bits in the VHT-SIGs may be relevant to one of the operational modes, but not to another mode. As such, certain bits may be ignored or interpreted differently for the different respective operational modes.

Operation in accordance with a SU-MIMO operational mode (which may include beamforming or precoding (steering) weights may be indicated in the VHT-SIG-A field. In one embodiment, the SU-MIMO case may be indicated in the VHT-SIG-A field by setting MU-MIMO bit to "0" (e.g., "MU-MIMO" indication may be used (1 bit)), for example (or SU-MIMO bit set to "1"). In another embodiment, the SU-MIMO or MU-MIMO cases may be indicated using the GroupID field (e.g., "0" for "SU-MIMO" and non-zero for MU-MIMO).

The HT-LTF Mode bit may be set to "0" or ignored. Also, when operating in accordance with an embodiment such as within FIG. 18A, the first VHT-LTF field may be used in combination with VHT-LTF fields after the VHT-SIG-B for estimating multiple channels, in order to save on the number of LTFs used.

Again, in some applications, a HT-SIG field may be inserted after the L-SIG for proper deferral of HT devices (e.g., IEEE 802.11n devices), and in other applications, a first field of the distributed SIG field (e.g., VHT-SIG-A) may be replaced by a HT-SIG for proper deferral of HT devices (e.g., 802.11n devices).

Figure 19:
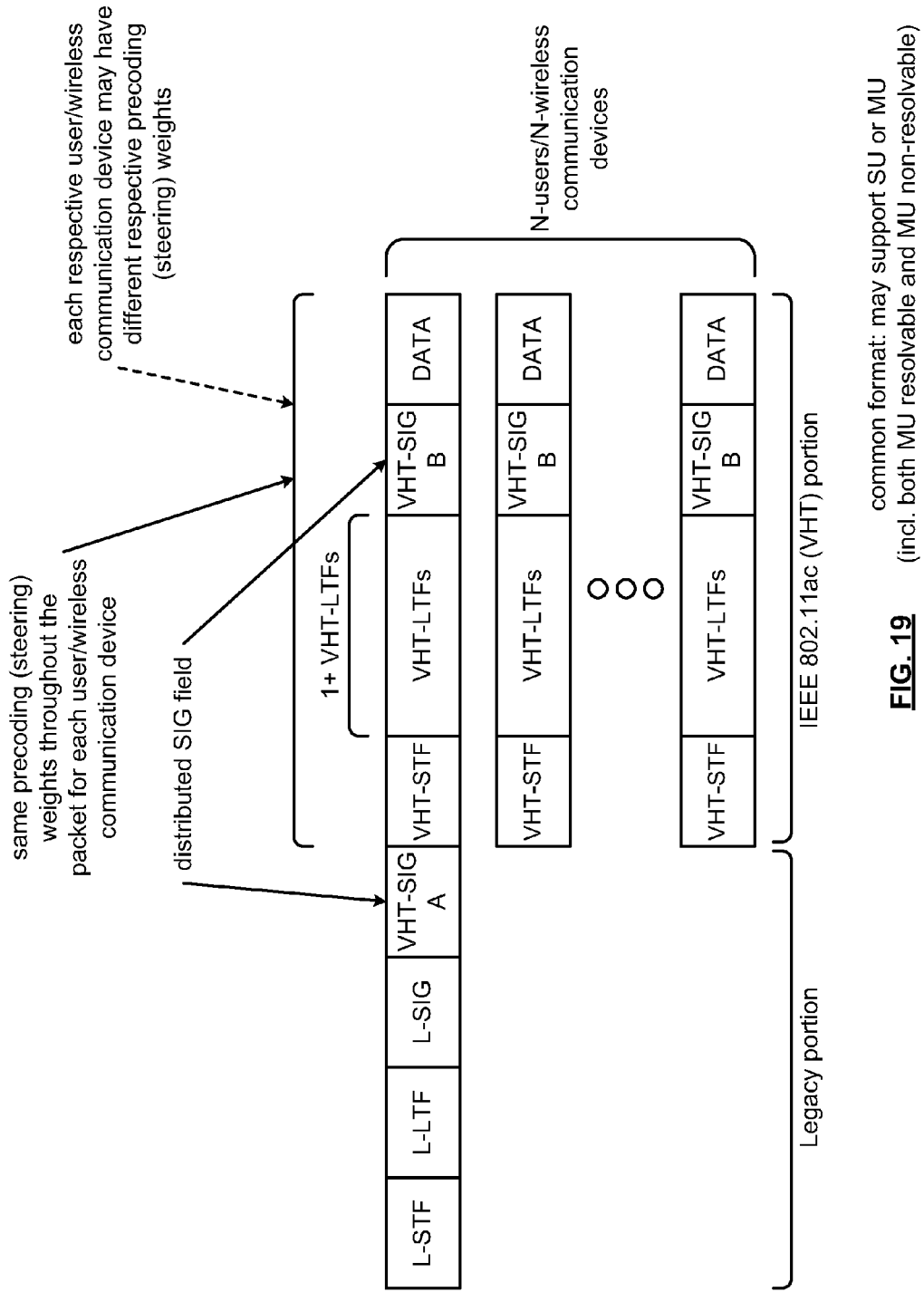
FIG. 19 is a diagram illustrating an embodiment of a frame format, having a unified preamble as applicable for both SU and MU operational modes (including both a MU resolvable operational mode and a MU non-resolvable operational mode) in which a common set of precoding (steering) weights being applied throughput a portion of the multi-user packet for each user.

FIG. 19 is a diagram illustrating an embodiment of a frame format, having a unified preamble as applicable for both SU and MU operational modes (including both a MU resolvable operational mode and a MU non-resolvable operational mode) in which a common set of precoding (steering) weights being applied throughput a portion of the multi-user packet for each user. Such precoding (steering) weights may begin at and include VHT-STF for both MU-MIMO and SU-MIMO embodiments. Also, each respective user/wireless communication device may have different respective precoding (steering) weights starting from and including VHT-STF until the end of the packet.

Such a MU operational mode may be indicated in the VHT-SIG-A by setting MU-MIMO bit to "1". For example, the VHT-LTF Mode bit may be set to "0" to indicate the non-resolvable LTFs operational mode. Each respective wireless communication device may have a different respective number of LTFs and therefore a different preamble length, depending on the number of communication channels to be estimated.

Referring again to the multi-user packet structure of FIG. 18B (e.g., also shown with respect to FIG. 19 that provides a common structure operative for supporting each of the various operational modes: SU operational mode, MU resolvable operational mode, and MU non-resolvable operational mode), each respective SIG field (e.g., L-SIG, HT-SIG, VHT-SIG-A or VHT-SIG-B) may include one or more OFDM symbols, depending on the amount of information that is to be included.

With respect to the legacy portion of the multi-user packet, legacy STF, LTF, and signal (SIG) field may be employed for detection by IEEE 802.11a and IEEE 802.11n compliant and operable wireless communication devices. The information rate may be set to 6 Mbps, and the corresponding multi-user packet length may be based on duration of access to the medium (e.g., time on the air). The IEEE 802.11ac mixed mode multi-user packet may be limited to duration of access to the medium (e.g., time on the air) as being equal to a maximum size of an IEEE 802.11a packet. The first component of the distributed SIG field (e.g., common SIG field component, VHT-SIG-A) contains information that may be processed and decoded by all users and may be needed for some or all of the wireless communication devices for processing of the VHT-STF and VHT-LTF fields. Such information contained within the first component of the distributed SIG field (e.g., VHT-SIG-A) may be bandwidth, number of VHT long training fields, etc. Again, as mentioned elsewhere herein, the first component of the distributed SIG field (e.g., VHT-SIG-A) may be transmitted from a transmitting wireless communication device omni-directionally (e.g., with no beamforming (precoding) or steering weights).

With respect to the VHT portion of the multi-user packet, the VHT-STF and VHT-LTF fields may be employed for automatic gain control (AGC) and channel estimation, respectively. The second component of the distributed SIG field (e.g., VHT-SIG-B) contains user specific signal field information such as MCS, packet length (bytes), etc. Again, as also mentioned elsewhere herein, the second component of the distributed SIG field (e.g., VHT-SIG-B) may be transmitted from a transmitting wireless communication device in accordance with beamforming (precoding) and steering weights when being transmitted to a single or multiple other wireless communication devices.

As may be seen, the SIG field may be partitioned into various components and distributed over different respective locations within the frame. In a preferred embodiment, the first component of the distributed SIG field (e.g., VHT-SIG-B) is included in a legacy portion of the packet, and the second component of the distributed SIG field (e.g., VHT-SIG-B) is included in the VHT portion of the packet.

Various embodiments presented herein with respect to formats of some of the various fields within such packets (e.g., possible and variant formats of the first component of the distributed SIG field (e.g., VHT-SIG-B), and the second component of the distributed SIG field (e.g., VHT-SIG-B)), it is noted that such embodiments are exemplary, and a given design or implementation has great latitude to select any desired allocation of bits and individual fields therein as may be desired or appropriate for a given application.

FIG. 20 is a diagram illustrating an embodiment of a format of a first SIG field (e.g., VHT-SIG-A) as may be employed in accordance with a distributed SIG field. This first SIG field (e.g., SIG A) contains information that may be processed and decoded by to all wireless communication devices within the communication system, and may be useful for some or all of the those wireless communication devices. This particular embodiment includes the following individual fields therein with the number of bits allocation for each field as shown in the diagram:

Bandwidth—up to 4 different packet bandwidths allowed (20, 40, and 80 MHz expected, possibly 60 MHz)

N_LTF—number of VHT long training symbols
  Assumed to be the same for all users
  Any long training symbols beyond the number of space time streams for a given user (signaled in VHT-SIG-B) may be used Short_GI (SGI)—two different guard interval sizesCoding type—allows for 2 different types of codes Not sounding Aggregation—signals whether or not the packet contains an A-MPDU Reserved bits
  Some of the reserved bits may be used for MCS and/or Length fields (better protected (CRC) than similar information in L-SIG)

Some of the reserved bits may be used for MCS for receiving users in serial (sequence)

Some of the Length field bits in VHT-SIG-B may be moved to VHT-SIG-A

Some of the reserved bits may be used for MU and/or MU-MIMO indication

CRC—cyclic redundancy check to validate other fields of VHT-SIG-A

Tail bits—termination pattern for convolutional code

Again, it is noted that the particular order of the individual fields within VHT-SIG-A may change as desired in a particular application. Certain embodiments may always include the last two fields as being CRC and Tail Bits. Also, the bit widths of fields may be changed as necessary. Also, other fields may be added, and any of above fields may be transmitted in the second SIG field (e.g., SIG B) instead of or in addition to the first SIG field (e.g., SIG A), certain fields and/or bits may be removed entirely from the components of the distributed SIG field, or they may be ordered differently.

FIG. 21 is a diagram illustrating an embodiment of constellations as may be employed for at least two orthogonal frequency division multiplexing (OFDM) symbols that may be employed in accordance with a first SIG field (e.g., VHT-SIG-A) as may be employed in accordance with a distributed SIG field. These two symbols are sent as 6 Mbps within an IEEE 802.11a frame replicated in each 20 MHz bandwidth portion (e.g., within each 20 MHz cluster). These symbols include 48 information bits The first OFDM symbol may be sent with +/−1 binary phase shift keying (BPSK) modulation. In accordance with such operation, those wireless communication devices operating in accordance with IEEE 802.11 can be spoofed into classifying the frame as an IEEE 802.11a frame.

The second OFDM symbol may be sent with +/−j BPSK modulation, and receiving wireless communication devices may then be allowed to classify the frame as a VHT packet.

FIG. 22 is a diagram illustrating an embodiment of a format of a second SIG field (e.g., VHT-SIG-B) as may be employed in accordance with a distributed SIG field. Again, the second SIG field (e.g., VHT-SIG-B) includes information that is specific to a single packet and/or one or more wireless communication devices. This particular embodiment includes the following individual fields therein with the number of bits allocation for each field as shown in the diagram:

MCS—modulation and coding scheme used on data—may be 7 or 8 bits

Length—number of payload bytes in packet—may be 18 to 24 bits

STBC—mode of space time block coding used on data

Smoothing—denotes smoothing of channel estimate is recommended

Reserved bits

CRC—cyclic redundancy check to validate other fields of VHT-SIG-B

Tail bits—termination pattern for convolutional code

As analogously mentioned above with respect to one possible variant of the first SIG field (e.g., SIG A) of a distributed SIG field, the order of the fields within the second SIG field (e.g., SIG B) of a distributed SIG field may change.

Certain embodiments may always include the last two fields as being CRC and Tail Bits. Also, the bit widths of fields may be changed as necessary. Also, other fields may be added, and any of above fields may be transmitted in the first SIG field (e.g., SIG A) instead of or in addition to the second SIG field (e.g., SIG B), certain fields and/or bits may be removed entirely from the components of the distributed SIG field, or they may be ordered differently.

For example, an alternative embodiment for the VHT-SIG-B field contains 48 information bits that may be transmitted as follows:

Sent using IEEE 802.11a tone mapping, replicated in each 20 MHz channel in bandwidth May be sent as 2 OFDM symbols using 6 Mbps IEEE 802.11a rate May be sent as 1 OFDM symbol using 12 Mbps IEEE 802.11a rate May also be sent as 1 OFDM symbol using 4 pulse amplitude modulation (PAM) on each tone (also 12 Mbps)

BPSK, 4 PAM or QPSK constellations may be sent with 0 or 90 degree rotation on all symbols It is noted that transmitting the various fields such as L-SIG, HT-SIG or VHT-SIG-A/B in accordance with 4-PAM or QPSK modulation can effectuate a doubling of the number of coded bits transmitted within an OFDM symbol (as compared to BPSK). This could be used to transmit additional SIG information without increasing the number of OFDM symbols, or it could be used to reduce the number of OFDM symbols used to transmit a fixed number of bits.

For better protection, additional coding may be employed with respect to information bits (e.g., the data portion(s)) within a multi-user packet. If desired, a relatively simple and easily implanted code could be repetition code (e.g., bits being repeated) to provide for some coding gain.

With respect to MAC protection, if the frames are beam-formed from a beginning of the frame (e.g., for the SU or MU case), request to send (RTS) and clear to send (CTS) exchanges or clear to send to self (CTS2SELF) may be employed to protect the frame exchange. If VHT Greenfield (beamformed or omni-directional) is used, the RTS/CTS or CTS2SELF may be used to decrease in legacy or HT format may be used to protect the frame exchange, or RTC/CTS or CTS2SELF in VHT format may be used to decrease the collision probability.

If VHT-HT mixed mode (beamformed or omni-directional) is used (e.g., frames do not include L-SIG field), then RTC/CTS or CTS2SELF in legacy format may be used to protect the frame exchange, or RTC/CTS or CTS2SELF in HT or VHT format may be used to decrease the collision probability.

If the frames include omni-directional length information, then RTS/CTS or CTS2SELF may be used to decrease the probability of collision.

FIG. 23 is a diagram illustrating an alternative embodiment of a format of a first SIG field (e.g., VHT-SIG-A) as may be employed in accordance with a distributed SIG field. This first SIG field (e.g., SIG A) contains information that may be processed and decoded by to all wireless communication devices within the communication system, and may be useful for some or all of the those wireless communication devices. This particular embodiment includes the following individual fields therein with the number of bits allocation for each field as shown in the diagram:

Length/Duration (12 bit)

Bandwidth (2 bits)

Coding Type (1 bit)

Not Sounding (1 bit)

SGI (1 bit)

MU-MIMO bits (15 bits)

MU-MIMO indication (1 bit)

VHT-LTF Mode (1 bit)

GroupID (4 bits)

AID list (9 bits)

CRC (8 bits)

BCC tail bits (6 bits)

Reserved bits

This diagram specifically corresponds to an instance for operating in accordance with the MU resolvable operational mode (e.g., MU resolvable VHT-LTFs mode), which may be indicated by setting the LTF mode bit to "1").

Alternatively, operation in accordance with the MU non-resolvable operational mode (e.g., MU non-resolvable VHT-LTFs mode), which may be indicated by setting the LTF mode bit to "0"), and by also employing a similar definition of bits with at least one exception being that the GroupID (4 bits) and some of the bits in the AID list (e.g., 6 bits out of 9 bits) are not relevant. Those bits can be defined differently when LTF mode is set to 0 (e.g., when operating in accordance with the MU non-resolvable operational mode (e.g., MU non-resolvable VHT-LTFs mode)).

Again, the order of the fields within the first SIG field (e.g., SIG A) of a distributed SIG field may change. Also, the bit widths of fields may be changed as necessary. Also, other fields may be added, and any of above fields may be transmitted in the first SIG field (e.g., SIG A) instead of or in addition to the second SIG field (e.g., SIG B), certain fields and/or bits may be removed entirely from the components of the distributed SIG field, or they may be ordered differently.

FIG. 24 is a diagram illustrating an alternative embodiment of a format of a second SIG field (e.g., VHT-SIG-B) as may be employed in accordance with a distributed SIG field.

This particular embodiment includes the following individual fields therein with the number of bits allocation for each field as shown in the diagram:

MCS—modulation and coding scheme used on data—may be 7 or 8 bits

STBC—mode of space time block coding used on data—may be 2 or 3 bits

Smoothing—denotes smoothing of channel estimate is recommended—may be 1 bit

CRC—cyclic redundancy check to validate other fields of VHT-SIG-B—may be 4 or 8 bits BCC Tail bits—termination pattern for convolutional code—may be 6 bits Again, the order of the fields within the second SIG field (e.g., SIG B) of a distributed SIG field may change. Also, the bit widths of fields may be changed as necessary. Also, other fields may be added, and any of above fields may be transmitted in the first SIG field (e.g., SIG A) instead of or in addition to the second SIG field (e.g., SIG B), certain fields and/or bits may be removed entirely from the components of the distributed SIG field, or they may be ordered differently.

FIG. 25A, FIG. 25B, FIG. 26A, FIG. 26B, FIG. 27A, and FIG. 27B are diagrams illustrating various embodiments of methods for operating one or more wireless communication devices.

Referring to method 2500 of FIG. 25A, the method 2500 describes operations as may be performed within a transmitting wireless communication device. The method 2500 begins by generating a multi-user packet including a distributed signal (SIG) field composed of at least two SIG fields, as shown in a block 2510. Such generation of a multi-user packet may be performed in accordance with a baseband processing module (e.g., such as in accordance with the baseband processing module as described within FIG. 2) that is implemented within a wireless communication device.

The method 2500 continues by transmitting the multi-user packet to a plurality of wireless communication devices, as shown in a block 2520. The transmission of the multi-user packet may be transmitted using one or more antennae of such a wireless communication device.

Such a multi-user packet that includes a first SIG field and a second SIG field therein can include different types of information in each of the respective SIG fields. A first SIG field within the multi-user packet may include first information employed by each of the plurality of wireless communication devices for decoding at least one field within the multi-user packet, as shown in a block 2520a. A second SIG field within the multi-user packet may include second information employed by at least one of the plurality of wireless communication devices for decoding at least one field within the multi-user packet corresponding to the at least one of the plurality of wireless communication devices, as shown in a block 2520b.

In some embodiments, the at least one field within the multi-user packet that gets decoded based on the first information contained within the first SIG field is the very same field that gests decoded based on the second information contained within the second SIG field; in other words, in some instances, both the first information within the first SIG field and the second information within the second SIG field are employed for decoding at least one other field within the multi-user packet (e.g., a data field within the multi-user packet). In such an embodiment, the at least one field within the multi-user packet is decoded using both the first information and the second information contained within the first and second SIG fields, respectively.

Moreover, in some embodiments, the first information extracted from the first SIG field is employed for use in decoding the second SIG field to extract the second information there from. The first information may also be employed in decoding not only the second SIG field but also another field within the multi-user packet (e.g., a data field within the multi-user packet). In some embodiments when the first SIG field is employed for use in decoding the second SIG field to extract the second information there from, this second information from the second SIG field (e.g., that was extracted using the first information from the first SIG field) may be used in decoding another field within the multi-user packet (e.g., possibly also including the data field within the multi-user packet).

In even other embodiments, both the first information contained within the first SIG field and the second information contained within the second SIG field are extracted before decoding the at least one field within the multi-user packet. In such an embodiment, both the first information contained within the first SIG field and the second information contained within the second SIG field would be extracted before processing the at least one field within the multi-user packet.

Referring to method 2501 of FIG. 25B, the method 2501 describes operations as may be performed within a transmitting wireless communication device. This embodiment shows a variant of the prior embodiment specifically enumerating with specificity possible options for contents of the certain of the fields therein. The method 2501 begins by generating a multi-user packet including a distributed signal (SIG) field such that SIG A being included in a first operational mode portion (e.g., legacy portion) and SIG B being included in a second operational mode portion (e.g., IEEE 802.11ac (VHT) portion) of the multi-user packet, as shown in a block 2511. Such generation of a multi-user packet may be performed in accordance with a baseband processing module (e.g., such as in accordance with the baseband processing module as described within FIG. 2) that is implemented within a wireless communication device.

The method 2501 then operates by transmitting the multi-user packet to a plurality of wireless communication devices, as shown in a block 2521. The transmission of the multi-user packet may be transmitted using one or more antennae of such a wireless communication device. The SIG A field includes information employed by each of the plurality of wireless communication devices for processing or decoding at least one field within the multi-user packet, as shown in a block 2521a. In some instances, the at least one field (e.g., being two fields in this case) that gets decoded using information included within the SIG A field are both the VHT-STF and VHT-LTF fields.

In this embodiment, the SIG B field includes information (e.g., MCS, packet length (bytes), etc.) employed by a specific one or more of the plurality of wireless communication devices for processing or decoding at least one field within the multi-user packet, as shown in a block 2521b. In some embodiments, information extracted from both the SIG A field and the SIG B field are employed in decoding at least one field within the multi-user packet (e.g., information within both the SIG A field and information within the SIG B field may be employed for decoding at least one other field within the multi-user packet).

Alternatively, the information extracted from the SIG A field may be employed for use in decoding the SIG B field to extract the second information there from. In other words, information extracted from the SIG A field may be used to direct the decoding of the SIG B field to extract the information (e.g., MCS, packet length (bytes), etc.) that may be employed by a specific one or more of the plurality of wireless communication devices for processing or decoding at least one field within the multi-user packet.

Referring to method 2600 of FIG. 26A, the method 2600 describes operations as may be performed within a transmitting wireless communication device. The method 2600 begins by generating a multi-user packet including a distributed signal (SIG) field composed of at least two SIG fields, such that a first SIG field being included in a first operational mode portion (e.g., legacy portion) and a second SIG field being included in a second operational mode portion (e.g., IEEE 802.11ac (VHT) portion) of the multi-user packet, as shown in a block 2610. Again, within this embodiment as well, such generation of a multi-user packet may be performed in accordance with a baseband processing module (e.g., such as in accordance with the baseband processing module as described within FIG. 2) that is implemented within a wireless communication device.

The method 2600 continues by transmitting the first operational mode portion (e.g., legacy portion, that includes the first SIG field) of the multi-user packet to a plurality of wireless communication devices omni-directionally, as shown in a block 2620. The method 2600 then operates by transmitting the second operational mode portion (e.g., IEEE 802.11ac (VHT) portion, that includes the second SIG field) of the multi-user packet to the plurality of wireless communication devices in accordance with beamforming (steering) or precoding, as shown in a block 2630. The transmission of the various portions of such a multi-user packet may be transmitted using one or more antennae of such a wireless communication device.

Referring to method 2601 of FIG. 26B, the method 2601 describes operations as may be performed within a transmitting wireless communication device. The 2601 begins by receiving a multi-user packet including a distributed signal (SIG) field composed of at least two SIG fields (e.g., at least a first SIG field and a second SIG field), as shown in a block 2611. The receipt of such a multi-user packet may be effectuated using one or more antennae of such a wireless communication device.

The method 2601 then operates by processing the first SIG field to extract information for use in processing a first at least one field within the multi-user packet, as shown in a block 2621. The method 2601 continues by processing the first at least one field within the multi-user packet using the first information extracted from the first SIG field, as shown in a block 2631. In some embodiments, the information extracted from the first SIG field corresponds to information employed for processing or decoding VHT-STF and VHT-LTF within the multi-user packet.

The method 2601 then operates by processing the second SIG field to extract second information for use in processing a second at least one field within the multi-user packet, as shown in a block 2641. The method 2601 continues by processing the second at least field within the multi-user packet using the second information extracted from the second SIG field, as shown in a block 2651. In some embodiments, the information extracted from the second SIG field corresponds to information such as MCS, packet length (bytes), etc. employed for processing or decoding at least one portion of the multi-user packet.

Referring to method 2700 of FIG. 27A, the method 2700 describes operations as may be performed within a transmitting wireless communication device. The 2700 begins by receiving a multi-user packet including a distributed signal (SIG) field composed of at least two SIG fields (e.g., at least a first SIG field and a second SIG field), as shown in a block 2710. The method 2700 continues by processing the first SIG field to first extract information for use in processing at least one field within the multi-user packet, as shown in a block 2720. The method 2700 then operates by processing the second SIG field to second extract information for use in processing the at least one field within the multi-user packet, as shown in a block 2730.

The method 2700 continues by processing the at least one field within the multi-user packet using the first information extracted from the first SIG field and the second extracted from the second SIG field, as shown in a block 2740. As can be seen, information extracted from both the first SIG field and the second SIG field may be employed for use in decoding the at least one field within the multi-user packet.

As can be seen in this embodiment, information extracted from both the first SIG field and the second SIG field may be employed in processing and decoding at least one field within the multi-user packet (e.g., information within both the first SIG field and information within the second SIG field may be employed for decoding at least one other field within the multi-user packet).

Referring to method 2701 of FIG. 27B, the method 2701 describes operations as may be performed within a transmitting wireless communication device. The 2701 begins by receiving a multi-user packet including a distributed signal (SIG) field composed of at least two SIG fields (e.g., at least a first SIG field and a second SIG field), as shown in a block 2711.

The method 2701 then operates by processing the first SIG field to extract first information for use in processing the second SIG field, as shown in a block 2721. The method 2701 continues by using the first information extracted from the first SIG field for processing the second SIG field to extract second information for use in processing at least one field within the multi-user packet, as shown in a block 2731. As can be seen, the first information extracted from the first SIG field may be employed for use in and for directing the processing and decoding of the second SIG field to extract the second information there from.

The method 2701 then operates by processing the at least one field within the multi-user packet using the second information extracted from the second SIG field (and optionally also using the first information extracted from the first SIG field), as shown in a block 2741. Optionally, in some embodiments, the method may also operate by using the first information extracted from the first SIG field in conjunction with the second information extracted from the second SIG field in processing the at least one field within the multi-user packet.

This embodiment described above shows an example where information extracted from the first SIG field is employed to process and decode the second SIG field to extract second information from the second SIG field. This second information may then be employed for processing and decoding at least one field within the multi-user packet. In other words, information extracted from the first SIG field may be used to direct the decoding of the second SIG field to extract information that may be employed by one or more of the plurality of wireless communication devices for processing or decoding at least one field within the multi-user packet. Of course, both the first information and the second information may be employed to decode the at least one field within the multi-user packet.

It is noted that the various modules, circuitries, functional blocks, etc. (e.g., for encoding, for decoding, for baseband processing, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

Mode Selection Tables:

TABLE 1

| 2.4 GHz, 20/22 MHz channel BW, 54 Mbps max bit rate | | | | | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

| Channelization for Table 1 | |
|---|---|
| Channel | Frequency (MHz) |
| 1 | 2412 |
| 2 | 2417 |
| 3 | 2422 |
| 4 | 2427 |
| 5 | 2432 |
| 6 | 2437 |
| 7 | 2442 |

TABLE 2-continued

Channelization for Table 1

| Channel | Frequency (MHz) |
|---|---|
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |

TABLE 7-continued

Channelization for Table 6

| Channel | Frequency (MHz) |
|---|---|
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modu-lation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
a communication interface; and
a processor, the processor and communication interface configured to:
generate a packet that includes a first signal (SIG) field, a second SIG field, and at least one other field located between the first and second SIG fields;
set a plurality of bits within a group identification field (GroupID) of the first SIG field to a first value to indicate the packet is a single user (SU) packet or set the plurality of bits within the GroupID of the first SIG field to a second value to indicate the packet is a multiple user (MU) packet, wherein when the packet is a MU packet:
   the first SIG field includes information for use by both first and second other wireless communication devices to process a first other field in the MU packet; and
   the second SIG field includes information for use by one or both of the first and second other wireless communication devices to process a second other field in the MU packet; and
transmit the packet.

2. The wireless communication device of claim 1, wherein when the packet is a MU packet, the processor and the communication interface are further configured to:
   generate the second SIG field to include first information for use by the first other wireless communication device to process the second other field in the MU packet; and
   generate the second SIG field also to include second information for use by the second other wireless communication device to process a third other field in the MU packet.

3. The wireless communication device of claim 1, wherein the processor and the communication interface are further configured to:
   transmit the first SIG field of the packet using omni-directional transmission and the second SIG field of the packet using beamforming transmission.

4. The wireless communication device of claim 1, wherein the processor and the communication interface are further configured to:
   transmit at least a portion of the packet using beamforming transmission to the first or second other wireless communication device when the packet is a SU packet.

5. The wireless communication device of claim 1, wherein the packet includes a first short training field (STF), followed by a first long training field (LTF), followed by the first SIG field, followed by a second STF, followed by a second LTF, followed by the second SIG field, followed by a data field.

6. The wireless communication device of claim 1, wherein the processor and the communication interface are further configured to:
   generate the packet as the MU packet;
   generate another packet as a SU packet;
   transmit the MU packet; and
   transmit the SU packet.

7. The wireless communication device of claim 1 further comprising:
   an access point (AP), wherein at least one of the first or second other wireless communication devices is a wireless station (STA).

8. The wireless communication device of claim 1 further comprising:
   a wireless station (STA), wherein at least one of the first or second other wireless communication devices is an access point (AP).

9. A wireless communication device comprising:
a communication interface; and
a processor, the processor and communication interface configured to:
   generate a packet that includes a first signal (SIG) field, a second SIG field, and at least one other field located between the first and second SIG fields, wherein the packet includes a first short training field (STF), followed by a first long training field (LTF), followed by the first SIG field, followed by a second STF, followed by a second LTF, followed by the second SIG field, followed by a data field;
   set a plurality of bits within a group identification field (GroupID) of the first SIG field to a first value to indicate the packet is a single user (SU) packet or set the plurality of bits within the GroupID of the first SIG field to a second value to indicate the packet is a multiple user (MU) packet, wherein when the packet is a MU packet:
      the first SIG field includes information for use by both first and second other wireless communication devices to process a first other field in the MU packet; and
      the second SIG field includes information for use by one or both of the first and second other wireless communication devices to process a second other field in the MU packet; and
   transmit the packet such that the first SIG field of the packet is transmitted using omni-directional transmission and the second SIG field of the packet is transmitted using beamforming transmission.

10. The wireless communication device of claim 9, wherein when the packet is a MU packet, the processor and the communication interface are further configured to:
   generate the second SIG field to include first information for use by the first other wireless communication device to process the second other field in the MU packet; and
   generate the second SIG field also to include second information for use by the second other wireless communication device to process a third other field in the MU packet.

11. The wireless communication device of claim 9, wherein the processor and the communication interface are further configured to:
   generate the packet as the MU packet;
   generate another packet as a SU packet;
   transmit the MU packet; and
   transmit the SU packet.

12. The wireless communication device of claim 9 further comprising:
   an access point (AP), wherein at least one of the first or second other wireless communication devices is a wireless station (STA).

13. The wireless communication device of claim 9 further comprising:
   a wireless station (STA), wherein at least one of the first or second other wireless communication devices is an access point (AP).

14. A method for execution by a wireless communication device, the method comprising:
   generating a packet that includes a first signal (SIG) field, a second SIG field, and at least one other field located between the first and second SIG fields;
   setting a plurality of bits within a group identification field (GroupID) of the first SIG field to a first value to indicate the packet is a single user (SU) packet or setting the plurality of bits within the GroupID of the first SIG field to a second value to indicate the packet is a multiple user (MU) packet, wherein when the packet is a MU packet:
      the first SIG field includes information for use by both first and second other wireless communication devices to process a first other field in the MU packet; and the second SIG field includes information for use by one or both of the first and second other wireless communication devices to process a second other field in the MU packet; and transmitting the packet via a communication interface of the wireless communication device.

15. The method of claim 14, wherein when the packet is a MU packet, further comprising:
generating the second SIG field to include first information for use by the first other wireless communication device to process the second other field in the MU packet; and
generating the second SIG field also to include second information for use by the second other wireless communication device to process a third other field in the MU packet.

16. The method of claim 14 further comprising:
transmitting the first SIG field of the packet using omni-directional transmission and the second SIG field of the packet using beamforming transmission.

17. The method of claim 14 further comprising:
transmitting at least a portion of the packet using beamforming transmission to the first or second other wireless communication device when the packet is a SU packet.

18. The method of claim 14, wherein the packet includes a first short training field (STF), followed by a first long training field (LTF), followed by the first SIG field, followed by a second STF, followed by a second LTF, followed by the second SIG field, followed by a data field.

19. The method of claim 14 further comprising:
generating the packet as the MU packet;
generating another packet as a SU packet;
transmitting the MU packet; and
transmitting the SU packet.

20. The method of claim 14, wherein the wireless communication device is an access point (AP), and at least one of the first or second other wireless communication devices is a wireless station (STA).

* * * * *